United States Patent
Gupta et al.

(10) Patent No.: US 7,222,156 B2
(45) Date of Patent: May 22, 2007

(54) INTEGRATING COLLABORATIVE MESSAGING INTO AN ELECTRONIC MAIL PROGRAM

(75) Inventors: Anoop Gupta, Woodinville, WA (US); Mary P. Czerwinski, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 789 days.

(21) Appl. No.: 09/772,320

(22) Filed: Jan. 25, 2001

(65) Prior Publication Data

US 2002/0099777 A1 Jul. 25, 2002

(51) Int. Cl.
*G06F 15/16* (2006.01)
*G06F 3/00* (2006.01)
*G06F 9/00* (2006.01)
*G06F 17/00* (2006.01)

(52) U.S. Cl. .................. 709/206; 715/751; 715/752
(58) Field of Classification Search ................ 709/201, 709/202, 203
See application file for complete search history.

(56) References Cited

U.S. PATENT DOCUMENTS

| | | | |
|---|---|---|---|
| 5,548,506 A | 8/1996 | Srinivasan | |
| 5,892,761 A | 4/1999 | Stracke | |
| 6,101,480 A * | 8/2000 | Conmy et al. | 705/9 |
| 6,430,567 B2 | 8/2002 | Burridge | |
| 6,463,461 B1 * | 10/2002 | Hanson et al. | 709/204 |
| 6,496,849 B1 | 12/2002 | Hanson et al. | |
| 6,505,233 B1 | 1/2003 | Hanson et al. | |
| 6,507,865 B1 | 1/2003 | Hanson et al. | |
| 6,654,791 B1 | 11/2003 | Bates et al. | |
| 6,662,212 B1 * | 12/2003 | Chandhok et al. | 709/206 |
| 6,704,772 B1 | 3/2004 | Ahmed et al. | |
| 6,769,012 B1 | 7/2004 | Liu et al. | |
| 2002/0016788 A1 | 2/2002 | Burridge | |
| 2002/0087646 A1 | 7/2002 | Hickey et al. | |
| 2002/0099775 A1 | 7/2002 | Gupta et al. | |

OTHER PUBLICATIONS

Sarah L. Roberts-Witt, Jun. 13, 2000, Business 2.0 website, "Drop It In the Mail; Email, the Internet's killer app, gets a makeover", pp. 1-3.*
Kessler, Mark G. "Intra-Nets: Open Messaging Technology and Opportunities for User Driven Information Spaces," Jun. 1996, IEEE, pp. 128-135.*
Libes, Don "Concepts of the NIST EXPRESS Server," Jun. 1994, IEEE, pp. 26-31.*
Michael Raynel, "Logical Time" Capturing Causality in Distributed Systems, Feb. 1996, IEEE Computer, pp. 49-56.
Cliff Edwards, "Zaplets Turns E-Mail Interactive", news.excite.com/news/ap/001029/15/interactive-e-mail, Oct. 29, 2000, pp. 1-3.
Sarah L. Roberts-Witt, "Drop It In The Mail: Email, the Internet's Killer App. Gets a Makeover", Jun. 13, 2000, pp. 1-3.

(Continued)

*Primary Examiner*—Jason Cardone
*Assistant Examiner*—Azizul Choudhury
(74) *Attorney, Agent, or Firm*—Perkins Coie LLP

(57) ABSTRACT

Collaborative electronic mail messages are fully integrated into traditional electronic mail on the client end. The collaborative electronic mail allows users to have online discussions without the clutter of numerous related individual electronic mails in the inbox, while at the same time reducing any deviation from the electronic mail user interface as seen by the end users.

19 Claims, 18 Drawing Sheets

OTHER PUBLICATIONS

Zaplet Internet Reference www.zaplets.com, p. 1, printed Jan. 26, 2001.
Zaplet Internet Reference, www.zaplets.com/producs/index.htm, pp. 1-2, printed Jan. 26, 2001.
Zaplet Internet Reference, www.zaplets.com/products/tech_overview.htm, pp. 1-2, printed Jan. 26, 2001.
Zaplet Internet Reference zaplet_zaplet.zaplet.com/index.jsp, p. 1.
Zaplet Internet Reference Sample Zaplets, 19 pages.
Gizmoz Internet Reference, www.gizmoznetworks.com, p. 1.
Press Release, "Gizmoz™, Inc. Launches The Gizmoz Collector Increasing Clients' Messaging Capabilities And Desktop Presence", Dec. 12, 2000, pp. 1-2.
Gizmos Internet Reference, www.gizmoznetworks.com/technology/technology.asp, pp. 1-2.
2WAY Internet Reference, www.2way.com/Products.html, "2WAY Products Drive Informed Decisions", p. 1.
2WAY Internet Reference, www.2way.com/ProductOverview.html, "2WAY Interactive System", pp. 1-2.
2WAY Internet Reference, www.2way.com/Connect/product.html, "The 2WAY Interactive System™ for the Business User", pp. 1-2.
2WAY Internet Reference, www.2way.com/Connect/process.html, "Designing and Deploying Your Own Interactive Web Communications", p. 1.
2WAY Internet Reference, www.2way.com/Connect/backend.html, "2WAY Connect Backend Implementation", p. 1.
2WAY Internet Reference, www.2way.com/Connect/technology.html, "2WAY Technology: Enabling Business Users with Unparalleled Access to Enterprise-Level Technology", pp. 1-2.
2WAY Internes Reference, www.2way.com/Connect/architecturegram.hml, "1WAY Interactive System™ Architecture", p. 1.
www.zaplets.com/services/index.htm, p. 1.

* cited by examiner

Fig. 6

☒ Interview Candidate Jamie Jones - Collaborative Message  ☐ ☐ ☒

File  Edit  View  Insert  Format  Tools  Actions  Table  Help

🖃 Send  [icons...]  Options...  🔲 ¶  100% ▾  ?

To...  [ ]

Cc...  [ ]

Subject: [ Interview Candidate Jamie Jones ]

◄ ──────────────────────────────── ► ▲

Interview Candidate: Jamie Jones
Position: Senior Programmer
Recommendation:
 Strong Hire ○
 Weak Hire ○      ├─┼─┼─┼─┼─┼─┤
 No Hire ○        5 10 15 20 25 30

|  | Attachments |
|---|---|
|  | 📎 Resume |
|  | 📎 Rec. Letter 1 |
|  | 📎 Rec. Letter 2 |

Comments/Feedback
Joe - 6/1/00  4:59pm

I think Jamie would be an excellent addition to our department. No one else has as much experience or as good a personality. The recommendation from George Smith (see Rec. Letter 1) is also worth a great deal.

Respondents
Joe

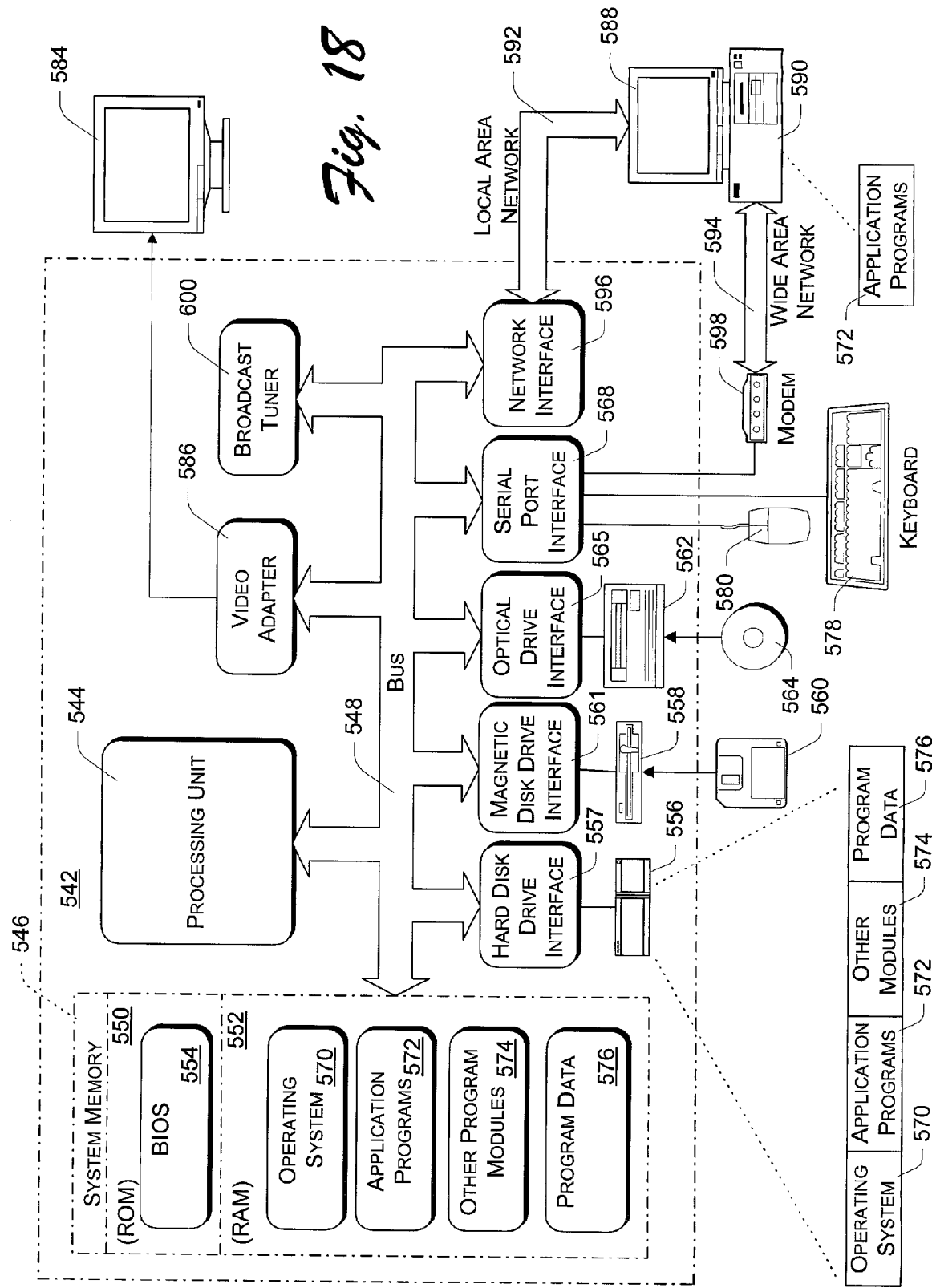

INTEGRATING COLLABORATIVE MESSAGING INTO AN ELECTRONIC MAIL PROGRAM

TECHNICAL FIELD

This invention relates to electronic message, and more particularly to integrating collaborative messaging into an electronic mail program.

BACKGROUND OF THE INVENTION

Electronic mail, commonly referred to as "email", has become an invaluable source of communication in the modern world. Email generally refers to an electronic version of a letter that is communicated from the sender's computer to one or more recipients' computers, possibly via multiple intermediary computers or computing devices. Email has numerous advantages—it allows communications to occur much more quickly than the traditional postal service, while at the same time allowing for the creation of a record of communications between sender and recipient.

Email, however, is not without its problems. One such problem is that users often like to carry out discussions via email. These discussions start, for example, with one email message sent to a group of recipients. One of the recipients responds to the email message with some comments, and sends the response to all of the recipients (and the original sender). Again, another recipient may respond to these new comments with some additional comments, and send this response to all of the other recipients (including the original sender and the sender of the first comments). Typical email systems forward messages by optionally including the text of the original message(s), as well as a list of all the recipients, subject, date and time, etc. This can result in many different email messages being sent to each individual participating in the discussion, and can result in long threads of messages that often include redundant information.

One possible solution to this problem is to store electronic mail content for a collaborative discussion on a centralized storage server (e.g., a web server or SQL server) and simply pass around a pointer to that storage in the electronic mail message. When a participant replies to the electronic mail the storage is updated and notification may be sent to the participants, which in turn can examine the latest status of the collaborative discussion by de-referencing the pointer to the storage sent around in the notification (or the original electronic mail). This can considerably simplify the ability to track discussions and facilitate collaborative decision making while at the same time avoiding electronic mail clutter.

However, there are problems with this approach. Without appropriate innovation, there are client-side user interface (UI) and interpretation issues, and server-side problems. One problem is that these web documents are hosted at a single location, providing a centralized model for distribution of the web documents. This is contrary to typical electronic mail systems which follow a distributed model in which copies of electronic mail messages are stored in multiple distributed locations (based on the individual recipients and authors of the messages). Being based on a centralized model, such electronic communications are not well-integrated into the users' distributed email systems. Many inconsistencies and duplications can arise due to this poor integration. For example, controls that users are accustomed to having displayed on the toolbars or menus of their email programs are duplicated (although possibly with different functionality) within the web document. Such duplications and inconsistencies result in a rather user-unfriendly interface that can be confusing and non-intuitive.

The invention described below addresses these disadvantages, integrating collaborative messaging into an electronic mail system.

SUMMARY OF THE INVENTION

Integrating collaborative messaging into an electronic mail program is described herein.

In accordance with one aspect, a collaborative electronic mail system that is fully integrated into traditional electronic mail on the client end is described. The collaborative electronic mail allows users to have online discussions without the clutter of numerous related individual electronic mails in the inbox, while at the same time reducing any deviation from the electronic mail user interface as seen by the end users.

BRIEF DESCRIPTION OF THE DRAWINGS

The present invention is illustrated by way of example and not limitation in the figures of the accompanying drawings. The same numbers are used throughout the figures to reference like components and/or features.

FIG. 6 illustrates a collaborative email message received by a user in accordance with certain embodiments of the invention.

FIG. 7 illustrates replying to a collaborative email message received by a user in accordance with certain embodiments of the invention.

FIG. 18 illustrates an example of a suitable operating environment in which the invention may be implemented.

DETAILED DESCRIPTION

The present invention is directed to the integration of collaborative electronic mail (email) messaging with more traditional email systems. Generally, a collaborative email message is an email message that can include input from multiple different users and that arranges the input in a user-friendly manner. Collaborative email messages can be used in any of a variety of situations, but are particularly useful in situations where a single seed (e.g., question) sparks a discussion among, or feedback from, multiple users. For example, a user may pose a question such as how to solve a particular problem, what features should be included in a new version of a product, what topics need to be covered at a meeting, what type of food should be brought in for lunch, where a student study group should meet, etc. An initial collaborative email message is generated by a message author and sent to recipients identified on a distribution list. This initial message can then be replied to by one or more of the recipients, and the collaborative email message modified to incorporate these replies.

General System

Figure 1:
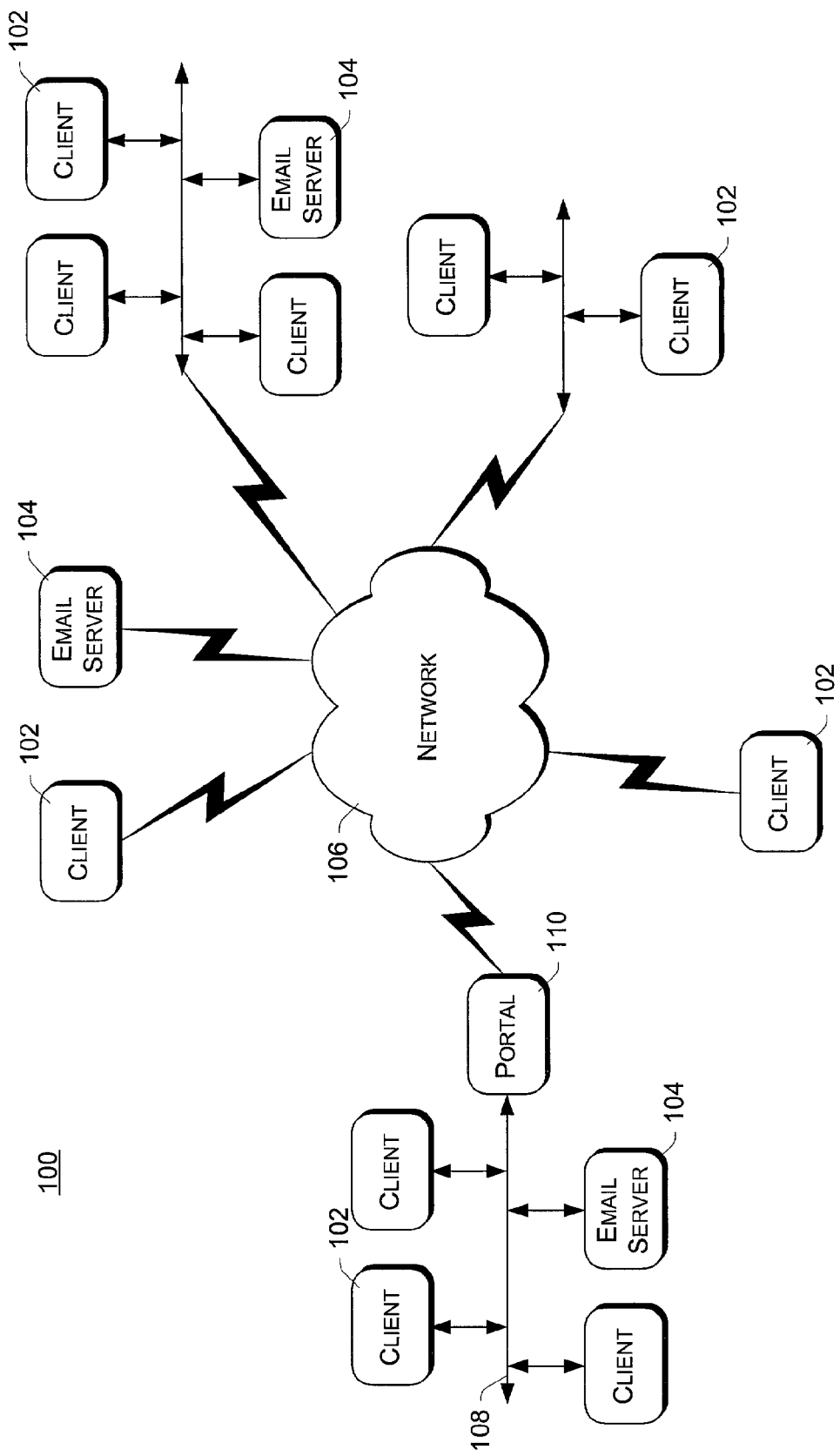
FIG. 1 is a block diagram illustrating an exemplary network environment in which certain embodiments of the invention can be practiced.

FIG. 1 is a block diagram illustrating an exemplary network environment 100 in which certain embodiments of the invention can be practiced. Various client computing devices in network environment 100 can communicate collaborative email messages to one another. Any of a wide variety of computing devices can be used to send and/or receive collaborative email messages, such as personal computers (PCs), hand-held or pocket devices, laptop devices, cellular telephones, personal digital assistants (PDAs), gaming consoles, Internet appliances, multiprocessor or single-processor systems, microprocessor-based or programmable consumer electronics, network PCs, minicomputers, mainframe computers, etc.

Multiple client computing devices 102 are illustrated in conjunction with multiple email servers 104 coupled to a data communications network 106. Communications network 106 can be any of a variety of networks, including a public network (e.g., the Internet), as well as a private network (e.g., a corporate local area network (LAN) or wide area network (WAN)), or combinations thereof. Communications network 106 can be implemented in any of a variety of different manners, including wired and/or wireless communications media.

Communication over network 106 can be carried out using any of a wide variety of communications protocols. In one implementation, network 106 and computing devices 102 support the World Wide Web. The World Wide Web (also referred to as simply the "web") is a collection of documents (also referred to as "web pages") that users can view or otherwise render and which typically include links to one or more other pages that the user can access. Communications using the World Wide Web can be in accordance with the Hypertext Transfer Protocol (HTTP), in which World Wide Web pages are written in a markup language, such as the Hypertext Markup Language (HTML) or the eXtensible Markup Language (XML).

Client computing devices 102 can be coupled to network 106 directly or alternatively via another network. For example, a corporate local area network (LAN) 108 may include a bridge or other communication portal 110 via which client devices 102 coupled to LAN 108 may communicate with network 106.

Each client computing device 102 runs an email program. The same email program may be run on all devices 102, or alternatively different programs (or different versions of one or more programs) may be run on the devices 102. Each device 102 has a corresponding email server 104 that the device is associated with. Alternatively, the email servers may be associated with particular users (e.g., by user ID) rather than with particular devices.

The device 102 can receive email messages from other devices as well as send email messages to other devices via its corresponding mail server 104. These email messages can include collaborative email messages as well as more traditional email messages. Typically, mail server 104 maintains the email messages for its associated devices 102 (or alternatively its associated users). Identifiers of these messages (e.g., subject, author, time stamp, importance, etc.) are then communicated from server 104 to device 102 and displayed to the user by the email program executing on device 102. When a user selects one of the messages for viewing, the contents of the message are then communicated from server 104 to device 102 for rendering to the user. Alternatively, device 102 may itself keep copies of all the email messages, synchronizing itself with the associated server 104 at various times (e.g., at periodic intervals, when manually requested by the user, etc.). The email server corresponding to a particular device may be on the same internal network (e.g., both coupled to LAN 108) or not (e.g., coupled together via network 106, such as an Internet service provider (ISP) used by the device to communicate with the Internet). In one implementation, the email program being run by the client computing devices is the Microsoft Outlook® email and collaboration program, and each mail server runs the Microsoft Exchange Server® program. Alternatively, different programs may be used.

The description herein primarily discusses a client device 102 that receives email communications from an associated email server 104. Alternatively, an email program executing at one or more of the client devices 102 may include the email server functionality. Thus, such a client would perform the operations of an email server 104 discussed herein, and would operate as a standalone client device (e.g., a client device that does not require an associated email server 104), such as in a peer-to-peer networking environment.

Figure 2:
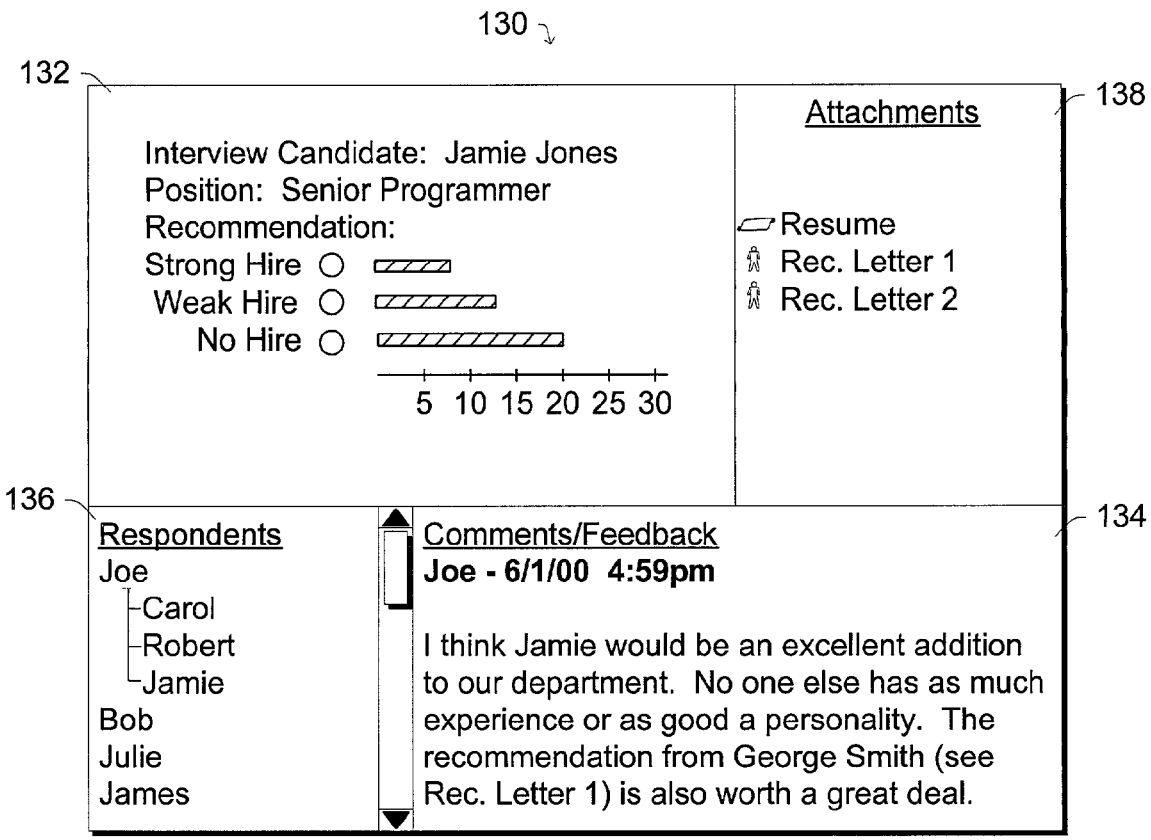
FIG. 2 illustrates an exemplary collaborative email message in accordance with certain embodiments of the invention.

FIG. 2 illustrates an exemplary collaborative email message in accordance with certain embodiments of the invention. In the illustrated example, a collaborative email message 130 is illustrated including a query portion 132, a feedback portion 134, a respondents portion 136, and an attachments portion 138. Collaborative email message 130 is a recruiting message, allowing the recipients to view information about the interview candidate as well as recommend whether or not to hire the candidate and add feedback regarding the candidate. Query portion 132 includes an initial question (asking for a recommendation as to whether to hire the candidate) and three choices (strong hire, weak hire, or no hire). A recipient of collaborative message 130 can select one of these three choices by positioning a pointer over the corresponding radio button and selecting (e.g., clicking with a mouse button) that radio button. Query portion 132 also includes a graph of the selections made by recipients of collaborative message 130 so far (8 people have recommended "strong hire", 13 people have recommended "weak hire", and 20 people have recommended "no hire"). Attachments portion 138 includes multiple recipient-selectable attachments for message 130, and in the illustrated example include a resume and two letters of recommendation for the interview candidate.

Respondents portion 136 includes the list of recipients that have responded to message 130 by selecting one of the radio buttons in query portion 132 and/or adding a comment or feedback for feedback portion 134. A scroll bar is included in query portion 132 to allow the recipient to scroll through the list or responds. When one of the responds is selected (e.g., high-lighted), the feedback or comments (if any) entered by that recipient are rendered in feedback portion 134. In the illustrated example, respondent Joe is selected and feedback portion 134 displays the comments input by Joe.

As illustrated, the source of each comment, including the date and time, is displayed in feedback portion 134. In certain embodiments, in order to improve the user-friendliness of the collaborative email message 130, care should be taken so that the comments in feedback portion 134 (and/or the list of respondents in portion 136) are arranged in a manner that gives the user an indication of which comment was entered in reply to which other comment (if any). This can be accomplished in any of a variety of manners. In the illustrated example of FIG. 2, the respondents are indented to indicate which recipient's comments were already entered at the time the comment was made. For example, Joe, Bob, Julie and James all responded before any other comments were added, while Carol, Robert and Jamie responded to the collaborative email message after Joe's comments were added but before Bob's, Julie's, or James' comments were added, so their names are indented and below Joe's name. Alternatively, other user interface mechanisms may be employed to indicate such relationships, such as numbering or lettering of comments or respondents, arrows spanning from/to the subsequent comments (or respondents) to/from the previous version of the collaborative email message they are in response to (that is, to/from the most recently entered comment (or user entering a comment)), etc.

A recipient of collaborative email message 130 may respond to the message by selecting one of the five choices in query portion 132, by entering a comment for feedback portion 134, or by doing both. Collaborative email message optionally includes an indication of a maximum number of selections that a user can make in query portion 132 (enforced, for example, by an email server or executable set of instructions in message 130), thereby limiting how many times the user can respond to message 130 with a selection in query portion 132 as well as how many options in query portion 132 the user can select. It should be noted, however, that collaborative email message 130 would typically be designed to allow a user to enter additional comments in feedback portion 134 even though he or she had already responded the maximum number of times via query portion 132.

In one implementation, collaborative email message 130 includes a set of instructions (e.g., a script or applet) that executes to generate the graph of selections. For example, collaborative email message 130 may include a count of the number of times each option has been selected by a different recipients. The set of instructions may be executed by an email server when the collaborative email message is being stored by the email server, or alternatively by the client email program when the collaborative email message 130 is being displayed.

Additional feedback information may also be included in query portion 132. By way of example, message 130 may maintain a record of each user that input a response that has been incorporated into the graph of selections illustrated in query portion 132. In response to user-selection of a portion of the graph (e.g., the bar representing the number of users selecting "strong hire") an identification of the users who selected "strong hire" may be displayed (e.g., in a separate box). This user-selection can be made in a variety of different manners, such as clicking on the bar with a cursor control device, simply positioning a pointing device over the bar, etc. Additional links may also be included in message 130 linking feedback portion 134 to query portion 132. For example, user-selection of a portion of the graph (e.g., one of the bars), may alter the display of feedback portion 134. The display may be altered in a variety of different manners, such as hi-lighting the users who selected the option corresponding to the selected bar, changing the ordering of comments in portion 134 so that the comments of users who selected the option corresponding to the selected bar are displayed first, etc.

The collaborative email messages are integrated with each user's email system. Thus, each time a user creates a new collaborative email message, views a collaborative email message, responds to a collaborative email message, etc., the user selects the actions to be taken by interacting with his or her email system, as discussed in more detail below.

Client Side Operations

Figure 3:
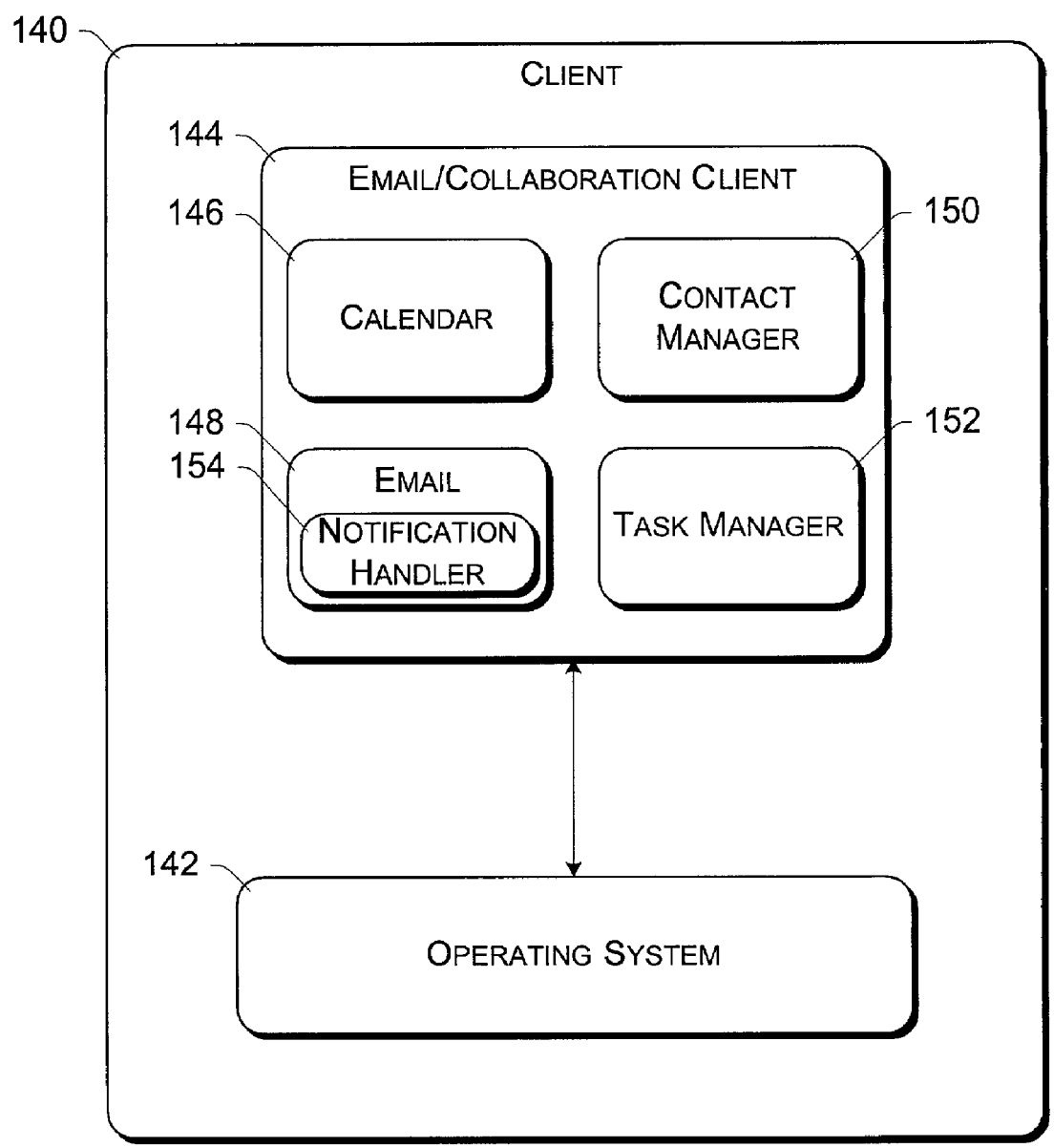
FIG. 3 illustrates an exemplary client computing device via which collaborative email messages can be made available to users in accordance with certain embodiments of the invention.

FIG. 3 illustrates an exemplary client computing device via which collaborative email messages can be made available to users in accordance with certain embodiments of the invention. Client computing device 140 is an example of a client device 102 of FIG. 1.

Client computing device 140 includes an operating system 142 that controls the execution of one or more application programs on device 140, including an email and collaboration client application program 144. Any of a variety of email and collaboration client application programs can be used as program 144, such as the Microsoft Outlook® email and collaboration client available from Microsoft Corporation of Redmond, Wash. Email and collaboration client 144 is designed to work in conjunction with a remote email server, such as a server 104 of FIG. 1. Email and collaboration client 144 may store some information locally (e.g., options and user preferences, identifiers of email messages, as well as possibly copies of information saved to one or more folders), but primarily relies on the remote email server to store information. Alternatively, client program 144 may store duplicate copies of information stored on the remote email server.

Email and collaboration client 144 optionally includes multiple components: a calendar component 146, an email component 148, a contact manager component 150, and a task manager component 152. Calendar component 146 manages an electronic calendar for a user of client device 140. Information from calendar component 146 is made accessible to other components of client program 144, allowing those components to display indications to the user as to whether certain times are available in the user's schedule. For example, if the user receives an email message requesting a one-hour meeting at 3 pm on April 1, then email component 148 can communicate with calendar component 146 to determine whether the user has a conflicting appointment or meeting on April 1 and display such a conflict (or absence of a conflict) to the user along with the email message.

Email component 148 manages electronic mail for the user of client device 140. Email component 148 presents a user interface via which the user can read and/or listen to email messages, compose new email messages, manage an "inbox" of received messages, etc. Email component 148, in managing electronic mail for the user, also manages collaborative email messages. New email messages (including collaborative email messages) are typically displayed to the user in his or her inbox, via which the user can open and otherwise manipulate the messages. Email component 148 optionally includes a notification handler 154 to attempt to determine an opportune time to render a notification to a user of client 140 of modifications to an existing collaborative email message and/or a new collaborative email message, as discussed in more detail below.

Contact manager component 150 manages one or more contact lists for the user of client device 140. The user can maintain various information for individuals or organizations, such as names, telephone numbers, mailing addresses, email addresses, etc., all of which is managed by component 150. The user can further create multiple different contact lists or address books to ease in organizing his or her contacts. Information from contact manager component 150 is also made accessible to other components of client program 144, allowing those components to take advantage of information already stored by component 150. By way of example, when a new collaborative email message is being created by a user, email component 148 may access contact manager component 150 to determine the email address or other personal information that corresponds to a particular recipient.

Task manager component 152 manages one or more task lists for the user of client device 140. The user can maintain lists of tasks he or she is to perform (or has been assigned by others). Multiple such lists can be created to ease in organizing the tasks. Information from task manager component 152 is also made accessible to other components of client program 144, allowing those components to take advantage of information already stored by component 152. By way of example, a collaborative email message may discuss a meeting at a particular time, but a deadline for a task in the user's task list may be within a particular period of time of the meeting. Email component 148 can access this task list information when displaying the collaborative email message and display an indication of the conflict (or alternatively the lack of a conflict) to the user.

Figure 4:
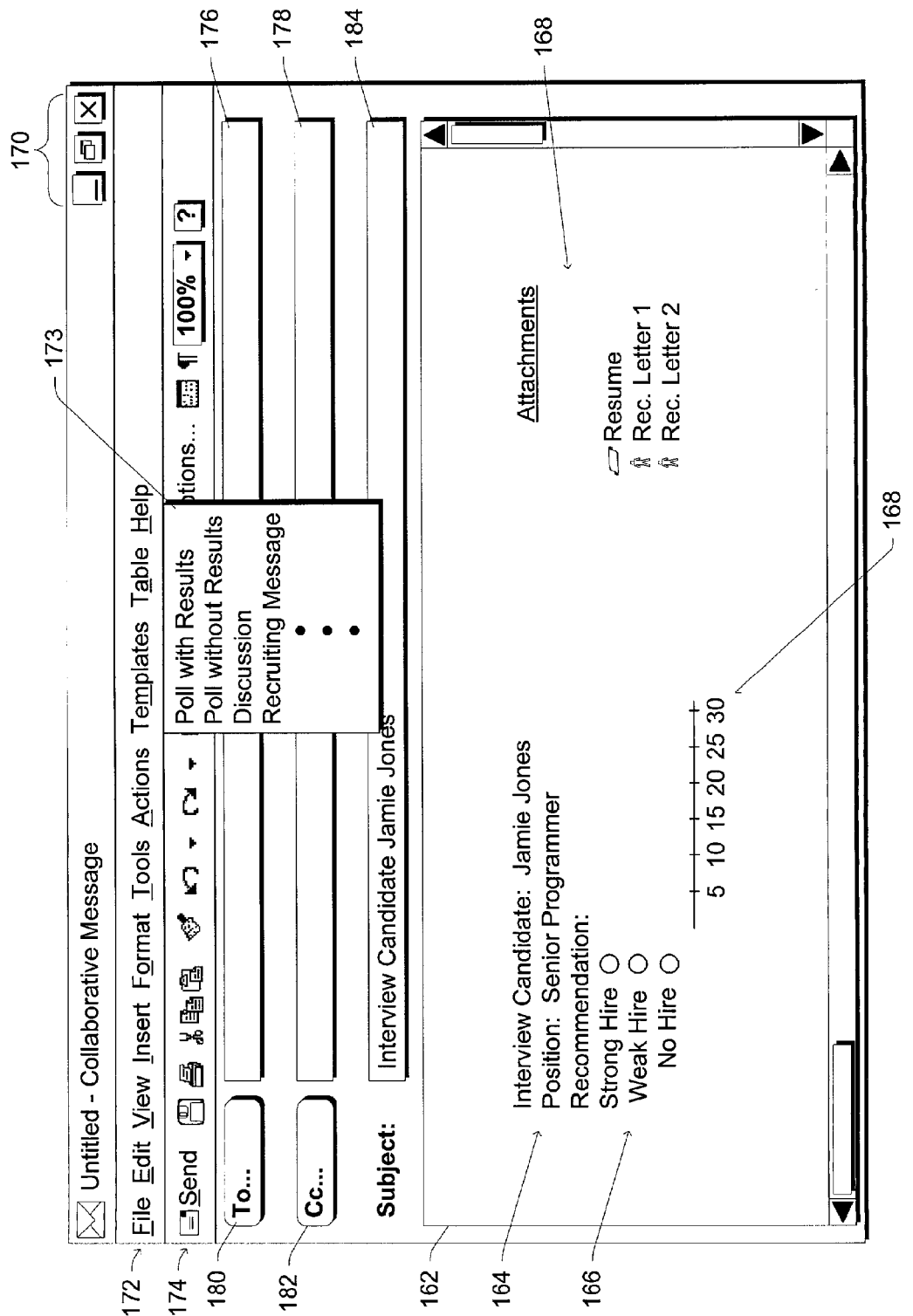
FIG. 4 illustrates a new collaborative email message being created by a user in accordance with certain embodiments of the invention.

FIG. 4 illustrates a new collaborative email message being created by a user in accordance with certain embodiments of the invention. The actual content of the collaborative email message can vary based on the operation of the email server system(s), as discussed in more detail below. However, typically the collaborative email message includes a distribution list (one or more recipients of the collaborative email message), message content (e.g., the actual data of the message or an identifier(s) of where the actual data can be found), and optionally other parameters regarding the message (e.g., priority, sensitivity, expiration date, etc.).

Creation of the new collaborative email message can be initiated in any of a variety of manners. By way of example, the author of the message could select a "new collaborative email" option of his or her email program, such as a new message icon, a menu selection, a control-key sequence (e.g., control-n), a particular one of multiple templates or forms stored by the email program, forwarding of a previously received collaborative email message, etc. In the illustrated example, the author has selected a "poll with results graph" template or a "recruiting message" template that allows the user to enter (e.g., by typing on a keyboard), in a message content area 162, a question 164, multiple options 166 for answering the question, a results graph 168 that identifies the answers to the question so far from the various recipients of the collaborative email message, and add attachments 169 to the collaborative email message. Templates can be selected in a variety of different manners, such as pull-down menus, tool bar icons, etc.

Any of a wide variety of different templates may be made available to the user. Examples of such templates include a "poll without results graph" template, polls with different types of results graphs, queries that require comments for a response (rather than, for example, selection of a radio button), etc. Additionally, users may be given the option to design their own customized templates (e.g., from scratch, using a template design assistant (often referred to as a "wizard"), based on another template, etc.).

Additionally, the author of a new collaborative email message may use a previous collaborative email message as a template for his or her new message. The user can use a previous collaborative email message as a template in a variety of different manners, such as selecting a "clone" or "use as template" option of his or her email program for the previous collaborative email message (e.g., via a pull-down menu option, toolbar icon, etc.). This causes the email program to make a copy of the previous collaborative email message and allows the user to modify it (e.g., change wording, delete replies and comments, change the recipients, etc.).

Creation of a collaborative email message is integrated with the author's email system. By integrating the creation of collaborative email messages with the author's email system, the collaborative email messages can take advantage of many (if not all) of the features of the email system. In the illustrated example of FIG. 4, many features of the Microsoft Outlook® email and collaboration client program that are used for traditional email messages can be taken advantage of in creating the collaborative email message.

The traditional Microsoft Windows® operating system window control options (minimize, restore, and close) 170 are available to the user. Additionally, a menu bar 172 and a toolbar 174 are also available to the user, including many options/features that users are accustomed to having available for creating more traditional email messages.

Menu bar 172 includes multiple drop down menus that allow various features to be selected by the author. These features include, for example, formatting and editing features to assist in the formatting and generation of the message in content area 162, as well as various email management features. Selection of the "File" menu allows the author to choose from options to save the collaborative email message, create a new collaborative email message, move the collaborative email message to a particular folder, print the collaborative email message, etc. Selection of the "Edit" menu allows the author to choose from options to cut or copy content from content area 162, paste content to content area 162, find and/or replace content from content area 162, etc. Selection of the "View" menu allows the author to choose from options to zoom in and out on content area 162, change the way in which content area 162 is displayed (e.g., for a "normal" view, a "print layout" view, a "web layout" view, or an "outline" view), select message options, change the toolbars that are displayed (e.g., remove toolbar 174, or add other toolbars), etc. Selection of the "Insert" menu allows the author to choose from various different data or objects that can be added to message content area 162, such as the current date, current time, a comment, a footnote, a caption, a special symbol, a cross reference, a table, a picture, a hyperlink, etc.

Selection of the "Format" menu allows the author to choose from various different formatting options for content area 162, including specific fonts, paragraph formatting, lists (e.g., numbered, bulleted, lettered, etc.), multiple columns, background color, automatic formatting of content area 162, etc. Selection of the "Tools" menu allows the author to choose from multiple different tools, including a thesaurus, spelling and/or grammar checking, a hyphenation assistant, a word counter, an auto summarization tool, macros (either execution or generation of macros), forms (either using or generating forms), etc. Selection of the "Actions" menu allows the author to choose from various email actions, including generating a new message (collaborative email message or otherwise), flagging a collaborative email message for follow-up, finding other messages related to the collaborative email message, forwarding a collaborative email message, etc.

Selection of the "Templates" menu allows the author to generate new collaborative email messages based on a set of templates. In the illustrated example, a pull-down menu 173 is illustrated listing multiple templates from which the user can select to generate a new collaborative email message (e.g., a recruiting message template, a poll with results template, a poll without results template, a discussion template, etc.).

Selection of the "Table" menu allows the author to generate and modify tables, such as creating new tables, adding and/or deleting rows and/or columns in a table, modifying the formatting of the table, etc. Selection of the "Help" menu allows the author to obtain help regarding the email system, such as help in creating collaborative email messages, program and/or version information for the email system, executing a Microsoft Office® Assistant to help the user, etc.

Toolbar 174 includes multiple different user-selectable icons that correspond to user-selectable options or features. Many of these options or features are duplicated within one of the menus from menu bar 172. For example, more commonly used features may be included in toolbar 174 so that the user need not navigate through the menu(s) to get to a frequently-used feature. Toolbar 174 is merely one example of a toolbar that may be displayed for use by the author of the collaborative email message—other toolbars, designed by the author or some other user or designer, may also be included, either in place of or in addition to toolbar 174.

In accordance with one implementation (e.g., using the Microsoft Outlook® email and collaboration program), the features implemented in response to selection of one of the various icons in toolbar 174 are as follows. An envelope icon and corresponding word "Send" cause the collaborative email message to be sent to the recipients identified in fields 176 and 178, discussed in more detail below. A disk icon causes the collaborative email message in its current state to be saved, a printer icon causes a hard copy of the collaborative email message to be printed, a scissors icon causes a selected portion of content area 162 to be cut, a duplicate-page icon causes a selected portion of content area 162 to be copied, and a clipboard/page icon causes previously cut or copied content (from content area 162 or elsewhere) to be pasted to content area 162. A paintbrush icon causes the format of the selected character or paragraph to be copied, a reverse arrow icon (undo typing) causes the previous one or more actions to be undone, and a forward arrow icon (redo) causes the previously undone one or more actions to be re-done. A table icon causes a table to be inserted into content area 162, a paragraph icon causes spaces and paragraph marks to be shown or hidden, a drop-down or pull-down menu allows content area 162 to be zoomed in or out, and a question mark icon causes a help program to run.

Additional icons, covered by pull-down menu 173, are also included in toolbar 174. These icons and the functions implemented in response to their selection are as follows. A paper clip icon allows a file to be attached to the collaborative email message, an address book icon causes the email program's address book to be displayed to the user, a checkmark and person icon (check names) causes the names identified in fields 176 and 178 to be checked against the author's address book for verification that the address book contains email addresses for those names, an exclamation point icon causes the collaborative email message to be a "high priority" message, a down arrow icon causes the collaborative email message to be a "low priority" message, and a flag icon allows the collaborative email message to be flagged for follow up. An options icon causes a dialog box with various options to be displayed for user selection, such as setting the sensitivity (e.g., normal, personal, private, confidential) or importance (e.g., high, normal or low) of the collaborative email message, encrypting or adding a digital signature to the collaborative email message, request delivery and/or read receipts for the collaborative email message, set an expiration or delivery time for the collaborative email message, select a category that the collaborative email message belongs to, etc.

The collaborative email message also includes two recipient lists—a "to" list 176 and a "cc" (carbon copy) list 178. Additional lists may also be included, such as a "bcc" (blind carbon copy) list. Both lists 176 and 178 are combined to form the distribution list for the collaborative email message, which is the list of all recipients for the collaborative email message. Whether an author should add a recipient to list 176 or 178 is dependent on the situation and the author's desires. The author may type or paste addresses or names into fields 176 and 178, and the email program may automatically expand such entries (e.g., partially entered names may be automatically completed). Alternatively, the author may choose one of corresponding address selection buttons 180 or 182. Selection of one of buttons 180 or 182 causes a dialog box to be displayed to the user, including a "to" list, a "cc" list, and the user's address book. The user is then able to "drag and drop" addresses from his or her address book (e.g., an address maintained by contact manager 150 of FIG. 3) into either or both of the "to" list and the "cc" list. The author can also enter (e.g., via a keyboard) a subject for collaborative email message 160 in subject field 184.

The different recipients on the different lists may be treated in the same manner or alternatively different manners. For example, any recipient may be able to add comments in response to a collaborative email message regardless of whether he or she is on the "to" list, the "cc" list, or the "bcc" list. Alternatively, only those recipients on the "to" list and the "cc" list may be able to respond to the collaborative email message; recipients on the "bcc" list cannot respond (and thus their identities not revealed). Preventing "bcc" recipients from responding can be accomplished in any of a variety of manners, such as disabling "forward" or "add my comments" options (discussed in more detail below) at the recipient's client when the recipient is in the "bcc" list.

Once the author has finished creating the collaborative email message and entered the desired recipients in one of files 176 or 178, he or she can send the collaborative email message (e.g., via a menu option from a menu on menu bar 172 or via an icon from tool bar 174). Sending the collaborative email message results in the collaborative email message (or an identifier of the collaborative email message) being communicated to each of the email servers associated with a recipient identified in the distribution list. The specific manner in which such communication is made can vary and is discussed in more detail below.

Email component 148 of FIG. 3 may also make a wide variety of additional options available to the author when creating a collaborative email message. The additional options may be selected by the author in any of a variety of manners, such as from a pull-down menu on menu bar 172, an icon on a toolbar 174, etc. Many of these options for collaborative email messages are the same as made available for conventional email messages. One such additional option is to give the author a "special" status compared to the recipients of the collaborative email message. This special status allows additional actions to be taken by the author that cannot be taken by the recipients, such as to require that the collaborative email message be encrypted or to prevent others (e.g., recipients) from modifying the collaborative email message (except, possibly, by answering questions in the collaborative email message or adding comments/feedback to the collaborative email message), the ability to "recall" the email message, etc. Any such actions taken by the author are identified in the collaborative email message and may be enforced by the email servers or the clients.

Another option is the ability to send out a reminder or summary of a previously sent collaborative email messages. The reminder option is selected by the user identifying the previously sent collaborative email message (e.g., by clicking on the message in his or her "sent items" box) and then selecting the "send reminder" option (e.g., from a pull-down menu) to send the reminder collaborative email message (the author may also be given the opportunity to alter the distribution list for the reminder collaborative email message). Alternatively, the reminder could be instigated via a checkbox option (e.g., analogous to the Microsoft Outlook® Calendar's "Meeting Request" template). When the author selects the reminder option, a reminder message is communicated to all of the recipients, reminding them of the previously sent collaborative email message (including a link to that message). Alternatively, the reminder collaborative email message may be sent to only a subset of the recipients (e.g., as identified by the author, only the recipients that have not yet responded to the collaborative email message, etc.). Each email server associated with a recipient of the reminder collaborative email message then communicates a notification of the reminder message to the associated recipient(s). This reminder may be displayed as a simple dialog with a link back to the collaborative email message or alternatively the identification of the previous collaborative email message in the recipient's inbox may simply be altered to indicate that the collaborative email message has not yet been read.

A summary option is similar to the reminder option, and can be selected in the same manner. When the author selects the summary option, the summary collaborative email message is communicated to all of the recipients both informing them that the issue covered in the collaborative email message is closed and summarizing the results. The results may be automatically summarized (e.g., a graph similar to graph 168) and/or manually summarized (e.g., summary comments entered by the author).

Additionally, email component 148 may present recipient (and possibly author) availability information to the user during creation of a new or response collaborative email message. This availability information may be displayed to the user in a variety of different manners, such as by displaying the users' addresses in fields 176 and/or 178 in different colors and underlines (e.g., green and solid for available, red and broken for unavailable). This availability information can refer to current availability (e.g., as the message is being created or responded to), or alternatively later availability (e.g., for a proposed meeting time).

The availability information can be obtained by email component 148 in a variety of different manners. Some information may be set manually by the user (e.g., "Out to Lunch", "Busy", etc.), while other information may be obtained via an intelligent sensing process. For example, to determine the availability of a particular recipient, email component 148 can communicate with its associated email server (or alternatively an instant messaging server), which in turn communicates with the server (email or instant messaging) associated with the recipient. Information regarding the recipient is obtained from the server associated with the recipient, such as the recipient's calendar to determine whether the recipient is currently in a meeting, or the recipient's current status online. If the recipient is currently in a meeting, then he or she is identified as being unavailable; otherwise, he or she is identified as being available. By way of another example, the recipient's telephone may be in communication with his or her client device, which in turn is in communication with his or her associated email server (or instant messaging server). Thus, the server is able to identify when the recipient is using the phone (e.g., receiver off the hook, phone line in use, etc.), so that he or she can be identified as unavailable if on the phone and otherwise available (or potentially available). This availability information can be used in a variety of different manners, such as allowing initiation of an instant messaging session that can subsequently be made part of a collaborative email message, informing the author of a collaborative email message who is available at the time the collaborative email message is created, etc.

Figure 5:
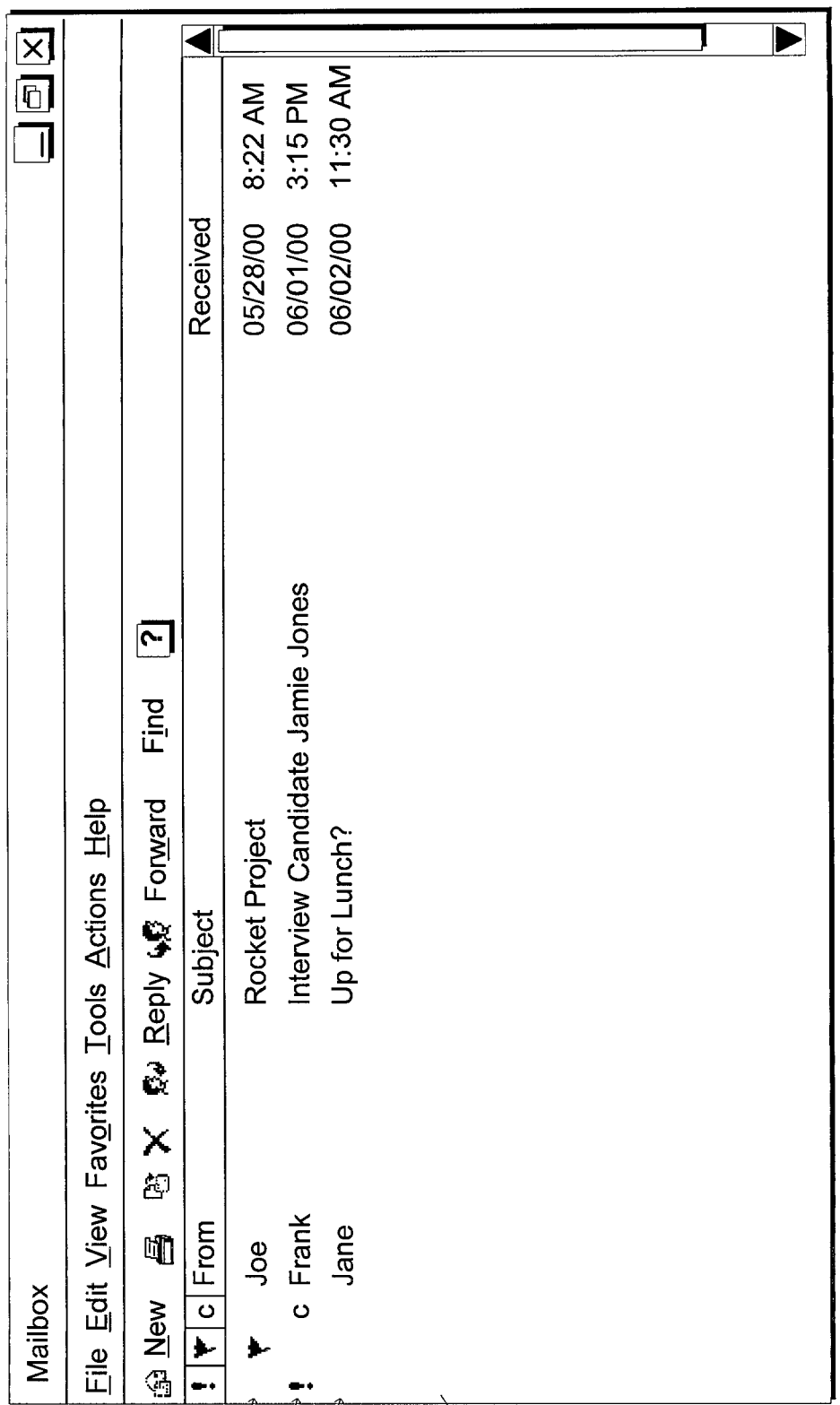
FIG. 5 illustrates an exemplary electronic mailbox of an electronic mail program in accordance with certain embodiments of the invention.

FIG. 5 illustrates an exemplary electronic mailbox (e.g., an "inbox") of an electronic mail program in accordance with certain embodiments of the invention. The electronic mailbox includes a list 190 of email identifiers, a menu bar 192, and a toolbar 194. Menu bar 192 includes many of the same drop-down or pulldown menus as menu bar 172 of FIG. 4, but also includes a "Favorites" menu that allows the user to select from a list of favorite locations (e.g., folders on the user's client device or one or more remote device(s)).

Toolbar 194 includes a letter and envelope icon with the corresponding word "New" that cause a new email message to be created (either a traditional email message or a collaborative email message). A printer icon causes a hard copy of the selected email message to be printed, a document and folder icon causes the collaborative email message to be copied to a folder (e.g., selected by the recipient) of the recipient's email system, and an "X" icon causes the collaborative email message to be deleted from the recipient's email system (note that various implementations may exist for deleting a collaborative email message, as discussed in more detail below in the Server Side Operations section). A reply icon and corresponding "reply" word causes a reply creation screen to be displayed via which the recipient can respond to a selected email message. The default list of recipients in response to the reply icon is the author of a traditional email message or everyone on the "to" and "cc" lists as well as the author for collaborative email messages. Selecting the reply icon for a collaborative email message is synonymous with selecting an "add comments" icon, discussed in more detail below with reference to FIG. 6. A forward icon and corresponding "forward" word causes a reply creation screen to be displayed with no default list of recipients (e.g., so the recipient can forward the email message to someone else). The "Find" word causes the user to be prompted for search criteria and the email messages of list 190 searched and an identification given to the user of which email messages satisfy the search criteria, and a question mark icon causes a help program to run.

Different information is included in list 190 to identify the various email messages. For ease of illustration, only three email messages are illustrated in list 190. One of the messages in list 190, message 196, has the subject "Rocket Project", was authored by the user "Joe", and is flagged for follow-up (as indicated by the flag icon). Another of the messages, message 198, has the subject "Up for Lunch?", and was authored by the user "Jane". In the illustrated example, an indication is also included as to whether the message is a collaborative email message or not. This example indication is the letter "c", indicating that the message 200 (which is also set as high priority, as indicated by the exclamation point) is a collaborative email message, whereas messages 196 and 198 are not collaborative email messages. Alternatively, collaborative email messages may be indicated in different manners, such as using different icons. Email component 148 of FIG. 3 can determine which messages are collaborative email messages itself (e.g., an indication may be inherent in the message's identifier, a flag or message type in the message may be set to indicate it is a collaborative email message, etc.), or alternatively be informed from the corresponding email server of which messages are collaborative email messages.

As illustrated in FIG. 5, collaborative email messages are identified in a user's mailbox as being sent from the author of the collaborative email message. Thus, the author of a collaborative email message is readily identified to the user in his or her inbox. Additionally, the user is optionally able to alter which information is included in his or her inbox to identify email messages, and the indication identifying collaborative email messages as collaborative email messages rather than some other type of email messages may not be displayed by the user's choice. Furthermore, any of the information displayed in list 190 (or alternatively other information regarding the email messages that is not displayed in list 190) can be used as the basis for sorting list 190. For example, list 190 as illustrated is sorted by receipt date, but could alternatively be sorted by subject, author, whether they are collaborative email messages, whether they are flagged for follow-up, priority, whether there are attachments, etc.

Identifying whether an email message is a collaborative email message has other advantages in addition to providing a visual indicator to the recipient. For example, the recipient may be able to search for only messages that are collaborative email messages. Additionally, messages may be automatically filtered upon receipt (e.g., in the same manner as rules are applied to messages using the Microsoft Outlook® email and collaboration program), allowing collaborative email messages to be copied or moved to a particular folder(s) of the recipient for easy organization.

Un-opened email messages, including collaborative email messages, are identified in list 190 in a manner to distinguish them from opened email messages. This distinction can be identified in a variety of different manners, such as using different icons (e.g., an opened envelope for opened email messages and a closed envelope for un-opened email messages), displaying the email identifiers in different fonts or colors, hi-lighting email identifiers of un-opened (or alternatively opened) email messages, bold-facing email identifiers of un-opened email messages, etc.

In the illustrated example, for each collaborative email message, there is only one email identifier in list 190. Modifications made to the collaborative email message may change the way in which the email identifier is displayed to the user, but does not add another email identifier to list 190 for that collaborative email message. For example, when a new collaborative email message is initially received, an identifier of the new collaborative email message may be displayed to the user in list 190 boldfaced to indicate it is un-opened. Once the user opens and reads the collaborative email message, the identifier is changed to non-boldface. If another recipient of the collaborative email message modifies the collaborative email message, then the identifier in list 190 is again changed to boldfaced to indicate to the user that changes have been made to the collaborative email message since he or she last opened the collaborative email message. Changes may alternatively be indicated in other manners, such as moving the collaborative email message to the top of list 190, adding another column to list 190 that distinguishes between "new" and "updated information", etc.

Figure 6:
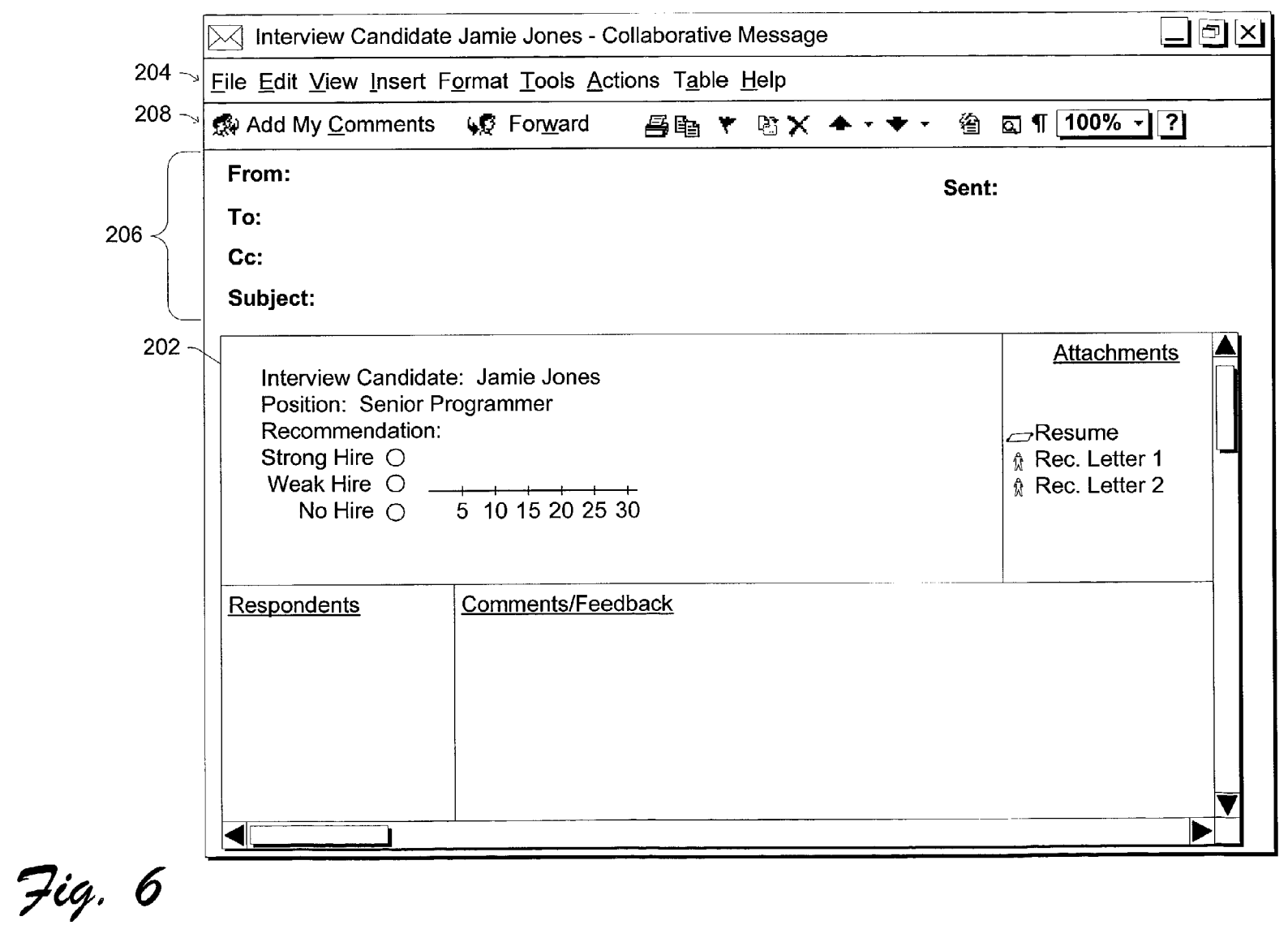

FIG. 6 illustrates a collaborative email message received by a user in accordance with certain embodiments of the invention. The example of FIG. 6 assumes that the collaborative email message discussed above with reference to FIG. 4 is received and opened by one of the recipients on the distribution list. Opening of a collaborative email message refers to displaying the content of the collaborative email message to the user (typically in response to a user-selection of the collaborative email message).

Analogous to creation of the collaborative email message, displaying a received collaborative email message is integrated into the user's electronic mail system. The received collaborative email message includes a message content area 202 where the author's question, the possible response options, the results graph, respondents, and comments are illustrated. The results graph, respondents, and comments show that no recipient has responded yet. A menu bar 204 is displayed to the user, analogous to menu bar 172 of FIG. 4. Similarly, subject and distribution list information 206 is displayed to the recipient, including an identification (e.g., email address) of the author and each individual in either "to" field 176 or "cc" field 178 of FIG. 4. Furthermore, an indication of the date and time that the message was sent by the author is also included.

A toolbar 208 is also displayed to the recipient of the collaborative email message. Analogous to toolbar 174 of FIG. 4, many (if not all) of the user-selectable features identified on toolbar 208 can be selected by the user via one of the menus from menu bar 204.

The actions that result from selection of one of the icons on toolbar 208 are as follows. An add comments icon and corresponding "add my comments" phrase causes a reply creation screen to be displayed via which the recipient can add his or her comments in response to the collaborative email message (or simply select one of multiple pre-determined responses to a question). The default list of recipients in response to the add comments icon is the author of the collaborative email message as well as everyone else that was on the distribution list of the collaborative email message (except, optionally, those on the "bcc" list).

A forward icon and corresponding "forward" word causes a reply creation screen to be displayed with no default list of recipients (e.g., so the recipient can forward the collaborative email message to someone else). In view of the nature of collaborative email messages, different options exist for "forwarding" collaborative email messages. For example, a "blind forwarding" or "clone" option may be selected by a recipient that causes a copy of the collaborative email message to be made and communicated to a new set of recipients, thereby creating a new collaborative email message with a potentially different distribution list. Another example is a "forward with read only" option that allows a recipient to forward the collaborative email message to another recipient so that the other recipient can read the collaborative email message, but does not allow the other recipient to modify (or respond to) the collaborative email message. Yet another example is a "forward with modify" option that allows a recipient to forward the collaborative email message to another recipient so that the other recipient can read and modify the message (e.g., effectively, this has the result of adding the other recipient to the distribution list for the collaborative email message).

Analogous to FIG. 4, a printer icon causes a hard copy of the collaborative email message to be printed, a duplicate-page icon causes a selected portion of content area 162 to be copied, a flag icon allows the collaborative email message to be flagged for follow up, a paragraph icon causes spaces and paragraph marks to be shown or hidden, a drop-down or pull-down menu allows content area 162 to be zoomed in or out, and a question mark icon causes a help program to run.

Additionally, a document and folder icon causes the collaborative email message to be copied to a folder (e.g., selected by the recipient) of the recipient's email system, an "X" icon causes the collaborative email message to be deleted from the recipient's email system (but not from that of the other recipients' email systems), the up arrow icon causes the preceding message in the user's email "inbox" to be displayed (whether it is a collaborative email message or a traditional email message), while a down arrow icon causes the subsequent message in the user's email inbox to be displayed (again, whether it is a collaborative email message or a traditional email message). A document and lightning bolt icon causes the content in content area 202 to be automatically formatted by an automatic formatting module. A document and magnifying glass icon causes a "document map" layout of the collaborative email message to be displayed, which displays a separate portion or "pane" in which headings used in the collaborative email message are displayed. A paragraph icon causes spaces and paragraph marks to be shown or hidden, a drop-down or pull-down menu allows content area 202 to be zoomed in or out, and a question mark icon causes a help program to run.

Additional features may also be available to the user if other recipients have previously added comments to the collaborative email message. Additional indications may be made to the recipient of what comments he or she has seen before and those he or she has not. For example, if three comments have been added to the collaborative email message since the recipient last viewed the collaborative email message, an identification of those three additional comments may be given to the user, such as underlining those comments, bold-facing those comments, using a different typeface or color for those comments, high-lighting those comments, etc.

Additionally, "tooltips" may be used to display a user's comments. A "tooltip" refers to additional information displayed (typically, in a box next to the on-screen cursor) when the cursor is resting on (or in close proximity to) a particular item. With collaborative email messages, if the cursor is resting on a user's name, then the comments added by that user can be displayed as a tooltip. Such tooltips can be displayed regardless of the location of the user's name in the collaborative email message (e.g., within the comments, on the "to" or "cc" lists, etc.).

Similarly, tooltips can be used to identify which recipients have answered a question in the collaborative email message. For example, positioning of the cursor on the "no hire" option would result in a tooltip being displayed that identifies each of the users that selected "no hire" regardless of whether they entered any additional comments.

FIG. 7 illustrates replying to a collaborative email message received by a user in accordance with certain embodiments of the invention. The example of FIG. 7 assumes that the collaborative email message discussed above with reference to FIG. 4 is received and opened by one of the recipients on the distribution list, and the recipient desires to respond/reply to the collaborative email message.

The response generation is similar to the collaborative email message creation discussed above with reference to FIG. 4. The same toolbar and menu bar are displayed, as are the same recipient identification fields. However, in the message content area 222 of FIG. 7, a recipient has entered his or her own comments. The recipient is able to enter whatever types of comments he or she would like, including text, drawings, tables, other insertable objects, etc. Although recipients will typically include comments to either the author's original question or some other recipient's comments, they are not limited to such. Additionally, the recipient is able to select one or more of the options corresponding to the author's original question.

Once the recipient is finished entering his or her comments, he or she can add recipients (in the to and cc fields) if desired, and then send the message. Alternatively, rather than the traditional "send" option, the user may be presented with an option specific to collaborative email messages, such as "Send My Comments". Regardless of the labeling of this option, invoking the option causes the collaborative email message to be modified and an indication of the newly modified collaborative email message communicated to each email server that is associated with one of the recipients. The exact manner in which such reply messages are communicated can vary, as discussed in more detail below.

Although a name is illustrated in the comments section, alternatively comments may be added anonymously. Anonymous comments may be a default setting, the author may indicate whether comments can be added anonymously, the individual recipients may be able to indicate whether their comment should be anonymous, etc. For example, when a recipient wants to add a comment, he or she may select an "anonymous comment" icon or pull-down menu option, select "anonymous" in a dialog box, etc. For anonymous comments, a record is kept (e.g., within the collaborative email message) of the comment but not which user made the comment. Thus, in the illustrated example of FIG. 7, only Joe's comments would be included in the comments/feedback section (and optionally the date and time information).

Figure 8:
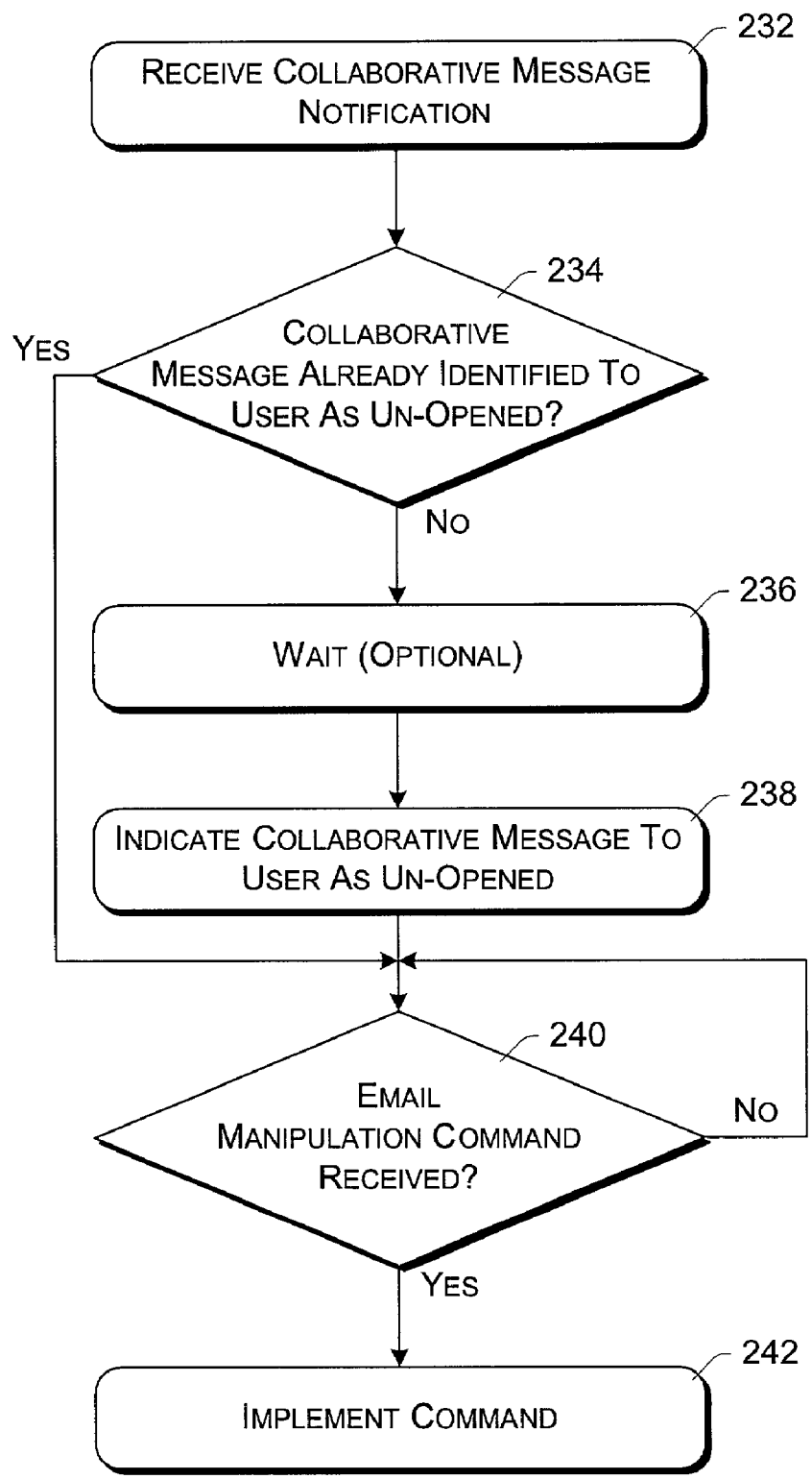
FIG. 8 is a flowchart illustrating an exemplary process for presenting and manipulating collaborative electronic mail messages in accordance with certain embodiments of the invention.

FIG. 8 is a flowchart illustrating an exemplary process for presenting and manipulating collaborative electronic mail messages in accordance with certain embodiments of the invention. The process of FIG. 8 may be implemented in software, and can be implemented by a client device (such as client device 140 of FIG. 3).

Initially, a collaborative email message notification is received (act 232). This can be a notification of a new collaborative email message or alternatively a modification to an existing collaborative email message. The client device then checks whether the collaborative email message is already identified to the user as un-opened (act 234). If the message is not already identified as un-opened, then the client device optionally waits for an amount of time (act 236). The amount of time to wait can vary (e.g., based on intelligent notification discussed in more detail below). Eventually, however, the client device indicates to the user that the collaborative email message is un-opened (act 238). This can be the creation of a new collaborative email message identifier in the user's inbox (e.g., for a new collaborative email message), or alternatively changing the appearance of an existing collaborative email message identifier in the user's inbox (e.g., for a modified collaborative email message). Additional information may also be provided, such as a parenthetical identifying the number of comments that have been added to the collaborative email message since the user last viewed the collaborative email message.

After the collaborative email message is indicated as being un-opened (whether in act 238 or if it was already indicated as un-opened), the client device waits for an email manipulation command to be received. Any of a wide variety of email manipulation commands can be selected by the user and received by the client device, such as adding comments to the message, forwarding the message, copying the message to a folder, deleting the message, etc. Once received, the client device implements the received email manipulation command (act 242).

Server Side Operations

Collaborative email messages can be maintained and modified in a variety of different manners. Three different exemplary embodiments are illustrated in the following figures, and are referred to generally as: a fully distributed system, a home server system, and a centralized application server system. In each of these exemplary systems, email servers are described as being responsible for managing collaborative email messages. Alternatively, a separate collaborative email message server may be set up that communicates with and operates in conjunction with the email server. In such situations, the collaborative email message server is responsible for managing collaborative email messages, while the corresponding email server is responsible for managing other traditional email messages.

Regardless of the manner in which the various servers communicate collaborative email messages amongst themselves, the collaborative email messages are integrated into the servers along with other more traditional email messages, and a recipient of a collaborative email message is typically able to respond to the collaborative email message. The exact manner in which the content of the response is entered can vary depending on the particular collaborative email message, what type of information the recipient wants to respond with, etc.

Figure 9:
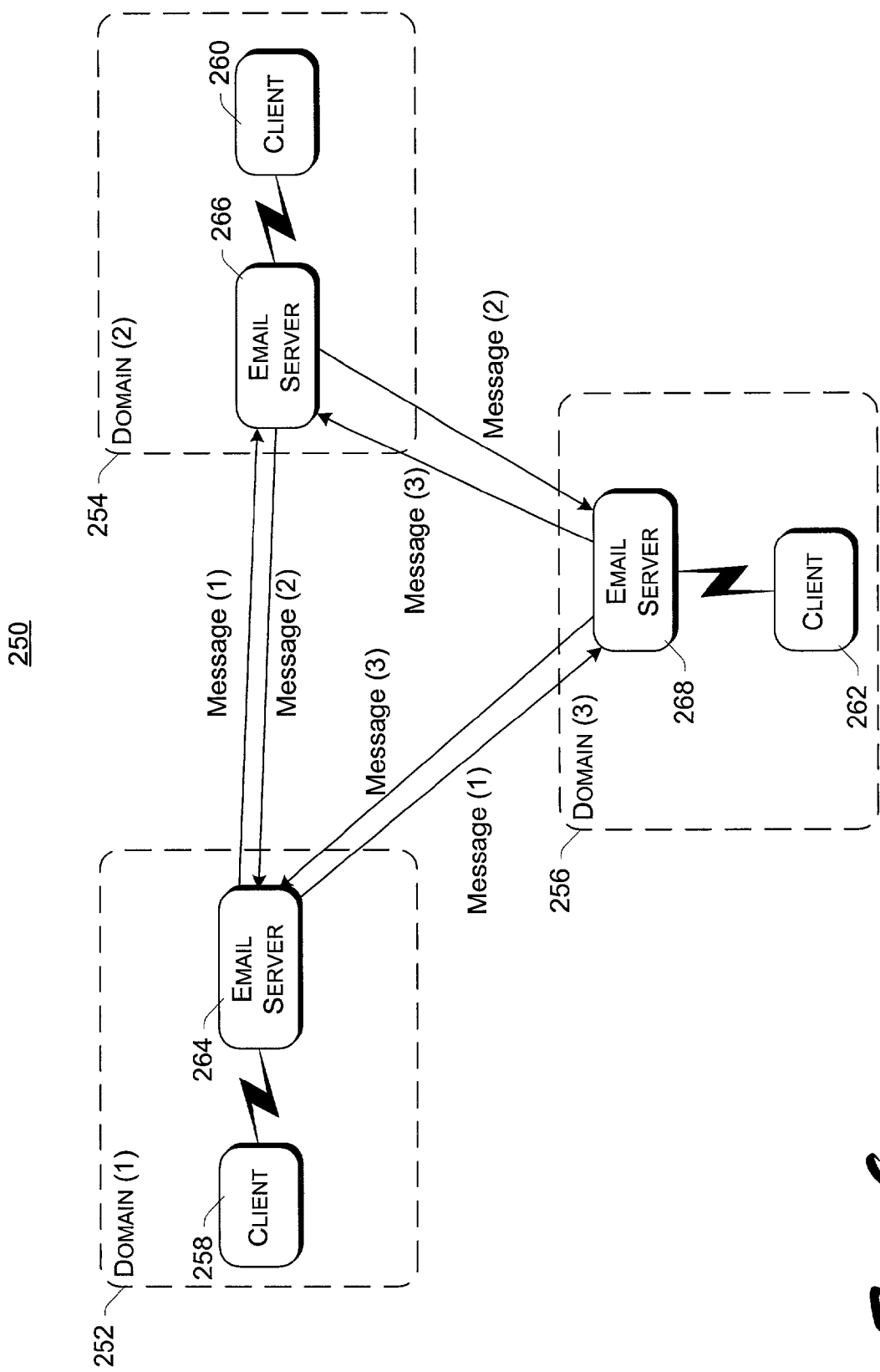
FIG. 9 is a block diagram illustrating an exemplary fully distributed server system that supports collaborative email messages in accordance with certain embodiments of the invention.

FIG. 9 is a block diagram illustrating an exemplary fully distributed server system 250 that supports collaborative email messages in accordance with certain embodiments of the invention. Three different domains 252, 254, and 256 are illustrated in system 250. Three domains are illustrated in FIG. 9 for ease of illustration. Alternatively, any number of domains (either greater or fewer than three) may be included in system 250. A domain as used herein refers to an email server and the one or more client computing devices that are associated with the email server. A domain may be within the same network (e.g., the computing devices and email server are all on the same corporate LAN), or alternatively may be spread out over multiple networks (e.g., two different LANs coupled together via the Internet). Additionally, a single network, such as a corporate LAN, may have multiple email servers with different client computing devices associated with each of the email servers, and thus multiple domains within the same corporate LAN.

Multiple clients 258, 260, and 262 are illustrated in system 250, as are multiple email servers 264, 266, and 268. In the illustrated example, a single client is included in each domain 252, 254, and 256, although alternatively multiple clients may be included in one or more of domains 252-256. Client device 258 is associated with email server 264, client device 260 is associated with email server 266, and client device 262 is associated with email server 268.

In the example of FIG. 9, assume that a collaborative email message has been created (authored) by a user of client device 258 identifying two recipients in its distribution list: one a user of client device 260, and another a user of client device 262. When the author of the collaborative email message sends the message, the collaborative email message is communicated to email server 264 which stores a copy of the collaborative email message locally at server 264. Email server 264 then forwards the collaborative email message (Message (1)) to each of the email servers 266 and 268, as they are associated with users identified in the distribution list of the collaborative email message. Upon receipt of the collaborative email message (Message (1)), each email server 266 and 268 stores a copy of the collaborative email message locally at the respective servers, and indicates to its associated client device 260 or 262 of the new collaborative email message. An indication of the new collaborative email message is displayed to the users of client devices 260 and 262 in their respective email inboxes. Each user can then open the new collaborative email message, causing the content of the collaborative email message to be communicated from the associated email server 266 or 268 to the client computing device. Alternatively, copies of the collaborative email messages may be communicated immediately to the client devices 260 and 262 from their associated email servers for storage at the client devices until opening of the collaborative email message by the user.

After opening the collaborative email message, assume that the user of client device 260 desires to respond to the collaborative email message. The user enters an "add my comments" command via his or her email program, inputs his or her response, and then sends the response. The response is communicated to email server 266, which modifies its stored copy of the collaborative email message. The manner in which the modification is made is dependent on the nature of the response. For example, if the user has entered new comments/feedback in the response, then email server 266 copies those comments/feedback into its stored copy of the collaborative email message (along with an identifier of the user and the date and time of the response). By way of another example, if the user has entered a response to a poll (e.g., selected a hiring recommendation in the above examples), then this response is detected by the email server and updated in the stored copy of the collaborative email message so that a running tally of responses (e.g., the results graph in the above examples) can be updated. Such a running tally of responses may be updated by the email server 266 itself (e.g., a new results graph may be generated by the email server and stored in the collaborative email message), or alternatively the collaborative email message may include a set of instructions (e.g., an applet) that causes the results graph to be generated each time the collaborative email message is opened based on the stored responses (e.g., email server 266 may simply store an indication of what hiring recommendation was selected in the response, and then an applet in the collaborative email message generates a new results graph incorporating the response the next time the collaborative email message is opened).

Email server 266 also communicates the response to both email server 264 (corresponding to the author of the collaborative email message) as well as email server 268 (corresponding to the other recipient of the original collaborative email message). This is illustrated as Message (2) in FIG. 9. Email server 266 may communicate the actual response received from client 260 to each of email servers 264 and 268, or alternatively email server 266 may generate a separate communication that includes only information identifying the original collaborative email message and the modifications added by the user of client device 260. Once Message (2) is received, each of email servers 264 and 268 update their locally stored copies of the collaborative email message based on the contents of Message (2), so that subsequent opening of the collaborative email message by a user of client 258 or 262 results in displaying of the modified collaborative email message (with the response from the user of client 260 incorporated into the original collaborative email message).

Additionally, assume that, after opening the collaborative email message (either the original message or the modified message), the user of client device 262 desires to respond to the collaborative email message as well. The user enters an "add my comments" command via his or her email program, inputs his or her response, and then sends the response. The response is communicated to email server 268, which modifies its stored copy of the collaborative email message and communicates the response to email servers 264 and 266 (analogous to the operation of email server 266 discussed above). This is illustrated as Message (3) in FIG. 9.

Thus, each email server 264, 266, and 268 maintains its own copy of the collaborative email message and modifies it in accordance with any received responses. In some situations, it would be preferential to keep the ordering of response the same across all copies of the collaborative email message at the various servers. For example, in FIG. 9 if comments/feedback are included in each of Message (2) and Message (3), and if Message (2) is sent prior to Message (3) being sent, each of servers 264-268 should have the ordering of comments/feedback to include those of Message (2) before those of Message (3). This is particularly true if, for example, Message (3) includes a response to comments in Message (2). However, situations can arise (e.g., due to various network delays) where a previously sent message is received after a subsequently sent message at one server, while before the subsequently sent message at another server. Thus, if based solely on time of receipt, the ordering of the two messages at the two servers would be different.

The ordering of messages is synchronized across multiple copies of the collaborative email message by having a set of message identifiers associated with each message (whether an initial collaborative email message or a reply to a collaborative email message). The set of message identifiers includes a root identifier, a parent identifier, and a message identifier. The message identifier uniquely identifies the message itself. The parent identifier is the message identifier of the parent of the message (that is, the message that this message is in response to). For example, in FIG. 9, if Message (3) were sent after the collaborative email message had been modified to include Message (2), then the parent identifier of Message (3) would be Message (2); otherwise, the parent identifier of Message (3) would be Message (1). The root identifier is the message identifier of the initial collaborative email message (that is, the message originally created by the author). By including the root identifier, each email server can readily identify which collaborative email message it is storing is to be modified given a particular response. In one implementation, for the initial collaborative email message, the root identifier, parent identifier, and message identifier are all the same.

Alternatively, other mechanisms can be used to synchronize responses. A discussion of some possible alternatives can be found in Raynal, M. and Singhal, M., "Capturing Causality in Distributed Systems" IEEE Computer (February 1996). One such mechanism is referred to as vector clocks (also referred to as vector timestamps). Using vector timestamps, the time domain is represented by a set of n-dimensional non-negative integer vectors (a different set of vectors exists for each collaborative email message). Each mail server $p_i$ maintains a vector $vt_i[1 \ldots n]$, where $vt_i[i]$ is the local logical clock of server $p_i$. $vt_i[j]$ represents the last knowledge by server $p_i$ of the local time of server $p_j$. If $vt_i[j]=x$, then server $p_i$ knows that the local time at server $p_j$ has progressed up to x. The entire vector $vt_i$ constitutes the view by server $p_i$ of the logical global time.

Each server $p_i$ uses two rules to update its clock. The first rule is that before executing an event (e.g., before processing a received response and before sending a response), the server $p_i$ that is to execute the event updates its local logical time as follows: $vt_i[i]=vt[i]+d$, where d is a constant (e.g., the value of one). The second rule is that each server $p_i$ includes an indication of its vector clock value with each response it sends. Upon receipt of such a vector clock by a server $p_j$, the server $p_j$ performs the following: for each element k in the vector, update its value of $vt_j[k]$ to be the maximum of its current value of $vt_j[k]$ or the received vector clock.

The timestamp of each response, then, is the value of the response's vector timestamp. Each server $p_i$ can thus determine, based on the vector timestamp of responses it receives, the time that each of the responses was created relative to one another, and thus the proper ordering of display for the responses.

Each time that a collaborative email message is modified, an indication of a new collaborative email message is given to each recipient and the original author of the collaborative email message (except, possibly, for the user whose response resulted in the modification). However, as the modifications to the collaborative email message are to the same message, the same entry identifying the collaborative email message remains in the user's inbox, although it may be displayed differently (e.g., high-lighted) to indicate that the collaborative email message has been changed since last being viewed by the user. Thus, even if a large number of people modify the collaborative email message, only a single entry remains in each recipient's inbox—the recipients' inboxes need not be cluttered with multiple entries (e.g., one per modification).

It should also be noted that the fully distributed server system 250 of FIG. 9 allows the user of a client 258, 260, or 262 to view collaborative email messages even when the client is "offline" or "disconnected" from the network. For example, client 260 may be a portable computer that synchronizes its email with email server 266 (so that client 260 maintains a duplicate copy of the email messages maintained by email server 266 for client 260, thereby allowing the user of client 260 to view email messages when not coupled to email server 266). Collaborative email messages would also be synchronized, so the user of client 260 is able to view collaborative email messages he or she has received (as well as sent) even though client 260 is not coupled to email server 266 (or any other server).

Note that in such situations the collaborative email message may actually be "stale"—that is, other users may have responded to the collaborative email message after client 260 was de-coupled from server 266 and thus those responses are not included in the collaborative email message viewed by the user of client 260. An indication that the collaborative email message being viewed may be stale can optionally be given to the user (e.g., a dialog box warning of the possibility of stale data, a different background or color for the collaborative email message if it may be stale, a special icon indicating the possibility of staleness, etc.). However, as soon as client 260 is re-coupled to email server 266, those responses are included in the collaborative email message viewed by the user of client 260. Similarly, the user of client 260 can respond to the collaborative email message when client 260 is not coupled to server 266, and that collaborative email message response is buffered by client 260 until client 260 is again coupled to server 266 (analogous to traditional email messages), at which point the response to the collaborative email message is communicated by server 266 to the other servers 264 and 268.

Figure 10:
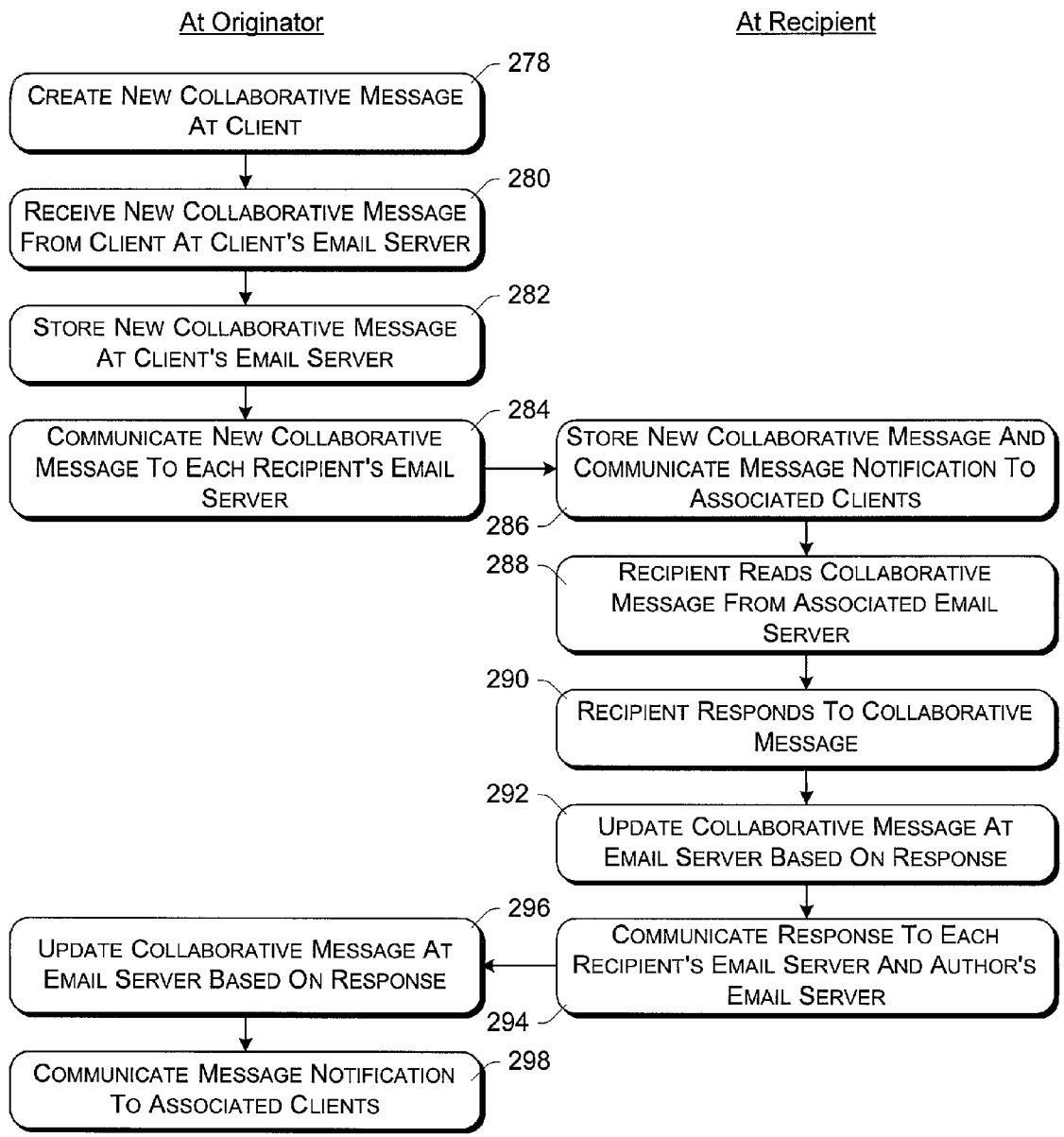
FIG. 10 is a flowchart illustrating an exemplary process for maintaining collaborative email messages in a fully distributed system in accordance with certain embodiments of the invention.

FIG. 10 is a flowchart illustrating an exemplary process for maintaining collaborative email messages in a fully distributed system in accordance with certain embodiments of the invention. The process of FIG. 10 is discussed with reference to an originator or author of a collaborative email message and a recipient of the collaborative email message, although the process may analogously apply for multiple responses and multiple different recipients.

Initially, a new collaborative email message is created at a client (act 278) and communicated to the email server associated with the author of the collaborative email message (act 280). The newly created collaborative email message is stored at the email server (act 282) and is also communicated to the email server associated with each recipient in the distribution list of the collaborative email message (act 284).

The new collaborative email message is then received and stored at the email server associated with a recipient of the collaborative email message, and a new message notification communicated to the client device of each user that is associated with the email server (act 286). A recipient of the collaborative email message then reads the message from the associated email server (act 288). The recipient responds to the collaborative email message (act 290), and the email server associated with the recipient updates its copy of the collaborative email message based on this response (act 292), including adding the recipient's comments (if any) into the appropriate location within the comments section based on the other comments that have been added so far. The email server then communicates the response to each email server associated with a recipient of the collaborative email message as well as the email server associated with the author of the collaborative email message (act 294).

The email server associated with the author of the collaborative email message then updates its copy of the collaborative email message based on the response (act 296), including adding the recipient's comments (if any) into the appropriate location within the comments section based on the other comments that have been added so far. The email server then communicates a notification of the modified collaborative email message to the client device being used by the author, as well as any other recipient of the collaborative email message that is associated with that email server (act 298).

Figure 11:
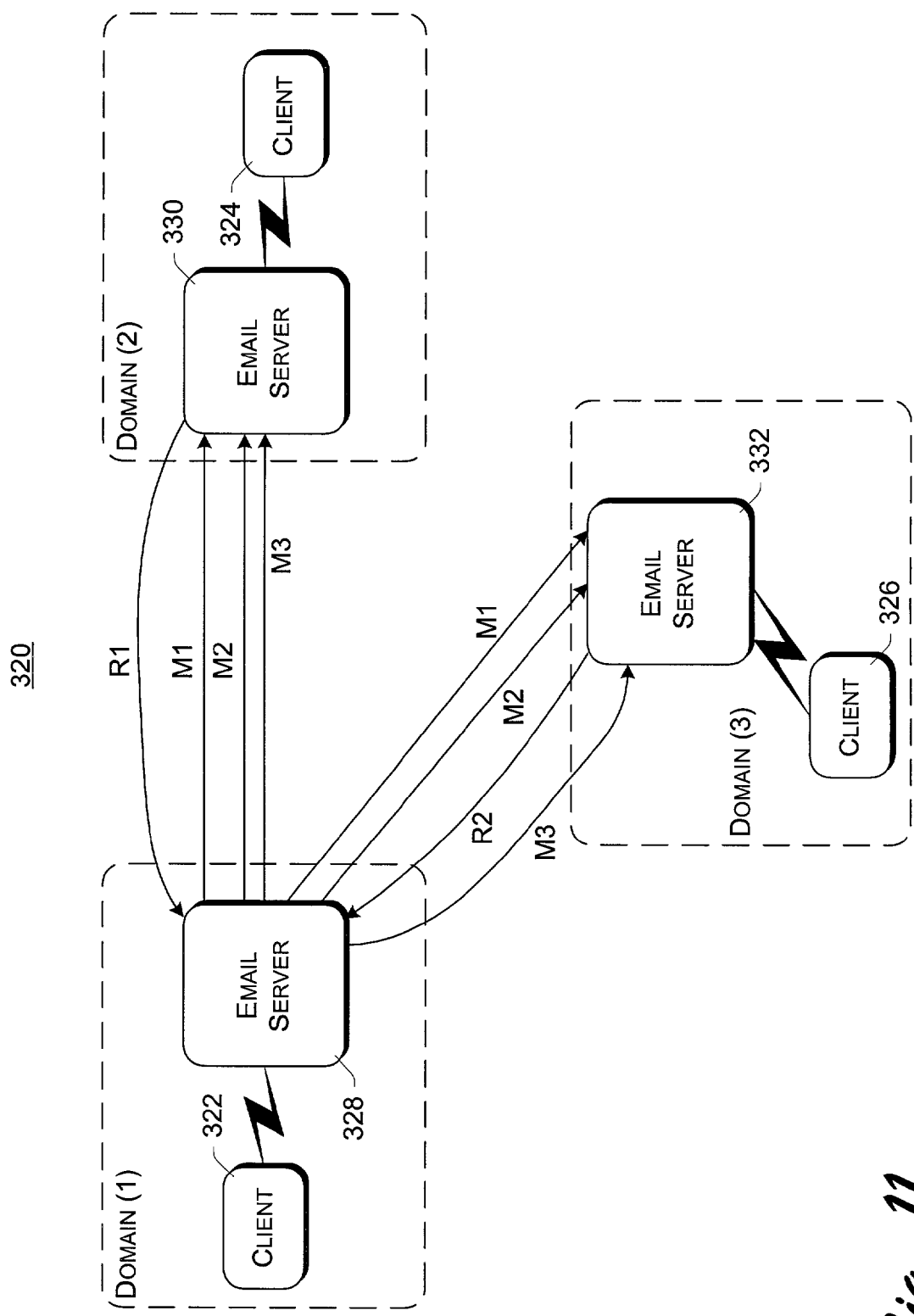
FIG. 11 is a block diagram illustrating an exemplary home server system that supports collaborative email messages in accordance with certain embodiments of the invention.

Looking now at the home server system, FIG. 11 is a block diagram illustrating an exemplary home server system 320 that supports collaborative email messages in accordance with certain embodiments of the invention. The home server system 320 is similar to the fully distributed server system 250 of FIG. 9, with multiple domains including email servers and clients. Client computing device 322 is associated with email server 328, client computing device 324 is associated with email server 330, and client computing device 326 is associated with email server 332.

Home server system 320 differs from the fully distributed server system 250 of FIG. 9, however, in that one of the email servers 328-332 is selected as a "home" server for a collaborative email message and is responsible for communicating modifications to that collaborative email message to all of the other email servers. The home server for a particular collaborative email message can be selected in any of a variety of manners, and in one implementation is selected as the email server that is associated with the author (original initiator) of the collaborative email message.

In FIG. 11, assume that a user of client 322 is the author of a collaborative email message and email server 328, associated with the user of client 322, is selected as the home server. A copy of the newly created collaborative email message is stored at email server 328 and is communicated (as M1) to each of email servers 330 and 332. Each of the email servers 330 and 332 also maintains a local copy of the collaborative email message, and communicates a notification of the new collaborative email message to the users of clients 324 and 326.

Assuming the user of client 324 responds to the collaborative email message, this response is received by email server 330. Email server 330 does not alter its copy of the collaborative email message, but rather communicates the response (as R1) to the home server (email server 328). Email server 328 then modifies its copy of the collaborative email message based on the response, and communicates (as M2) an indication of the modification to email servers 330 and 332. This indication can be a re-sending of the entire collaborative email message, or alternatively just the changes that were made to the collaborative email message based on the response. Each of the email servers 330 and 332, upon receipt of indication M2, modifies its local copy of the collaborative email message.

Additionally, assume that the user of client 326 also responds to the message (either M1 or M2). This response is received by email server 332, which communicates the response (without modifying its own copy of the collaborative email message) to email server 328 (as R2). Email server 328 again modifies the collaborative email message based on the response R2 and then communicates (as M3) another indication of the modification to each of email servers 330 and 332. Each indication or message (e.g., M1, M2, and M3) communicated by the home server includes an identification of the ordering of that indication or message in relationship to the other indications or messages (e.g., a combination of an identifier of the root message (e.g., message M1) and a sequence number). This allows the email servers receiving the indication or message to sort and/or display the received comments in a consistent manner (across all such email servers).

In one implementation, an email server that is not the home server and that receives a response tentatively makes the modification indicated by the response. This modification is indicated as being tentative (e.g., comments may be shadowed or italicized to indicate that they are tentative) until the modified collaborative email message is received from the home server. By way of example, if the user of client 324 responds to the collaborative email message, email server 330 may tentatively make the changes indicated in the response in its own local copy of the collaborative email message. Once M2 is received from email server 328, however, email server 330 modifies its stored collaborative email message in accordance with M2 (e.g., replaces its stored copy, alters its stored copy, etc.).

It should also be noted that the set of three identifiers (root, parent, and message), vector timestamps, etc. used with the fully distributed server system need not be used in the home server system. This is because all of the modifications are being made at the home server, which is then responsible for communicating to all of the other email servers what the current content of the collaborative email message is. Thus, each of the email servers receives the same indication of what the current content is from the home server (including the same sequence numbers), with comments being ordered in whatever fashion the home server desires (e.g., based on time of receipt at the home server, or alternatively the set of three identifiers, vector timestamps, etc. discussed above).

It should further be noted that, analogous to the discussion above regarding FIG. 9, the home server system 320 of FIG. 11 allows the user of a client 322, 324, or 326 to view and modify collaborative email messages even when the client is "offline" or "disconnected" from the network.

Figure 12:
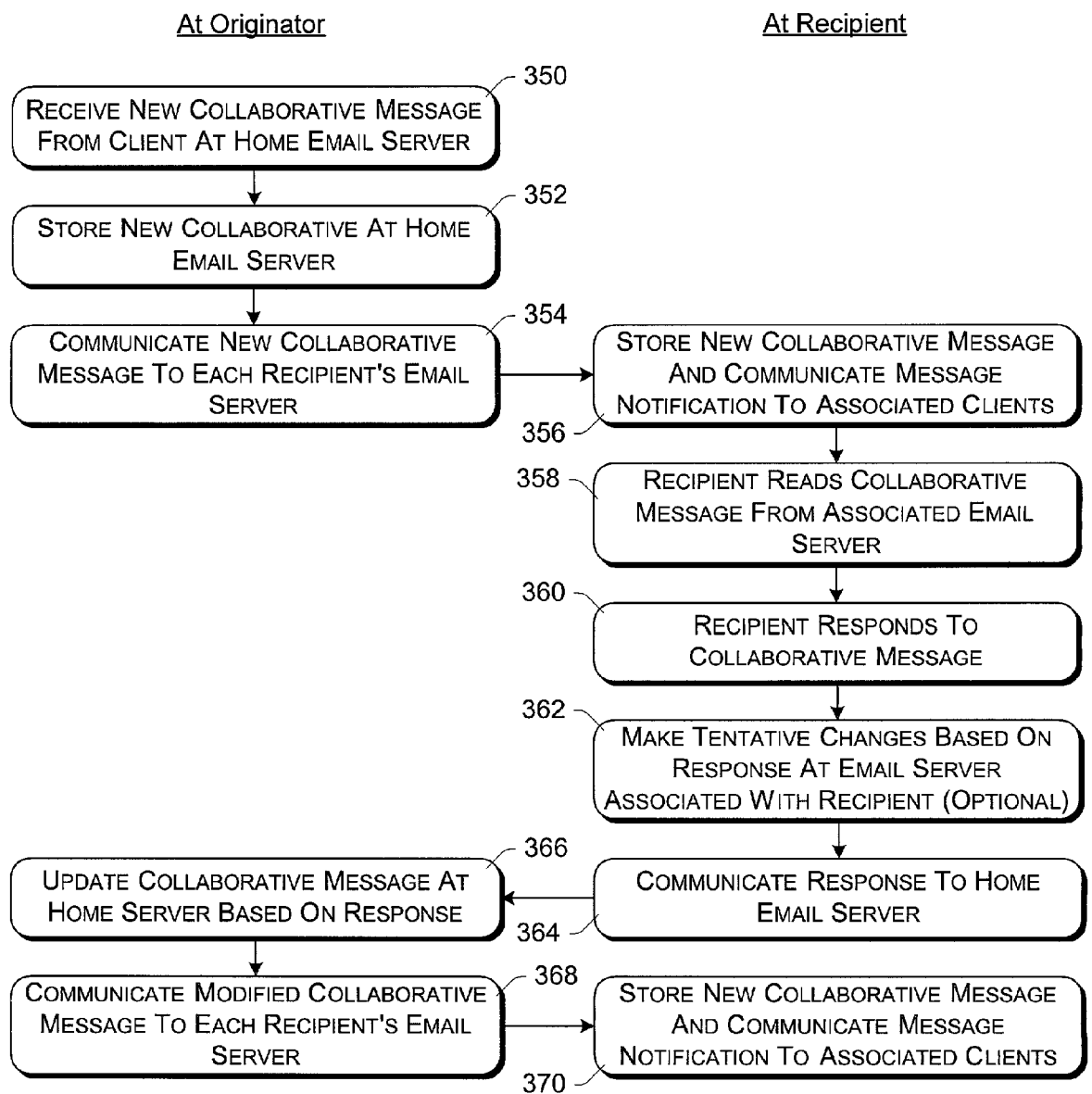
FIG. 12 is a flowchart illustrating an exemplary process for maintaining collaborative email messages in a home server system in accordance with certain embodiments of the invention.

FIG. 12 is a flowchart illustrating an exemplary process for maintaining collaborative email messages in a home server system in accordance with certain embodiments of the invention. The process of FIG. 12 is discussed with reference to an originator or author of a collaborative email message and a recipient of the collaborative email message, although the process may analogously apply for multiple responses and multiple different recipients.

Initially, the new collaborative email message is received from the author at the home email server, such as the email server associated with the author (act 350). The new collaborative email message is stored at the home email server (act 352) and communicated to each email server corresponding to a recipient on the distribution list of the collaborative email message (act 354). An email server associated with a recipient of the collaborative email message receives and stores a local copy of the new collaborative email message (act 356).

A recipient then reads the collaborative email message from his or her associated collaborative email message (act 358) and responds to the collaborative email message (act 360). The email server associated with the recipient receives the response and optionally makes tentative changes based on the response on the local copy stored by that email server (act 362). The email server then communicates the response to the home email server (act 364).

The home email server receives the response and updates the collaborative email message stored at the home server based on the response (act 366). A modified collaborative email message is then communicated to the email server of each recipient on the distribution list of the message (act 368). This communication in act 368 includes communicating the modified collaborative email message to the email server from which the response was communicated in act 364. Upon receipt of the modified collaborative email message, the email server associated with a recipient of the collaborative email message receives and stores a local copy of the modified collaborative email message (or alternatively modifies its stored copy in accordance with the received modified collaborative email message), and communicates a modified collaborative email message notification to the client(s) it is associated with (act 370).

Additionally, an alternative implementation of the home server system of FIGS. 11 and 12 may be used that is more resistant to failure of the home email server, but at the expense of additional communications traffic and temporary loss of some synchronization. In this alternative implementation, each response to a collaborative email message is communicated to the home server as well as the other email servers of each recipient on the distribution list of the message. Each of these other email servers can then make the responses available to their corresponding recipients. However, the home server is responsible for communicating, to each of these other email servers, an indication of the proper ordering of responses (e.g., sequence numbers), although the home server no longer needs to communicate the content of the responses to the other email servers. Thus, if the home server were to fail, each of the other email servers would receive the responses of recipients on the distribution list of the message, but they may display different orderings of the responses (because the sequence numbers or other ordering identification is not available from the failed home server).

Figure 13:
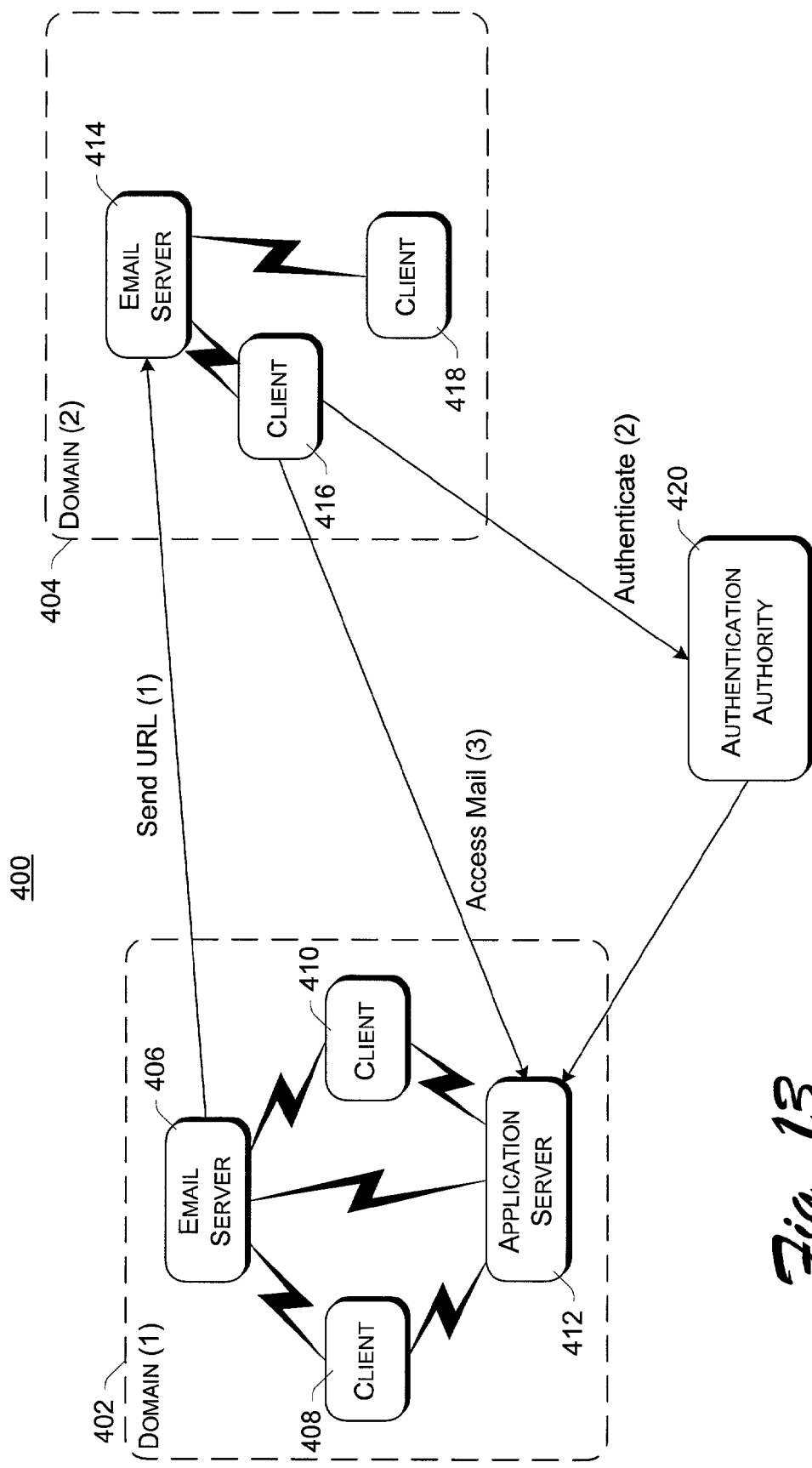
FIG. 13 is a block diagram illustrating an exemplary centralized server system that supports collaborative email messages in accordance with certain embodiments of the invention.

Turning now to the centralized application server system, FIG. 13 is a block diagram illustrating an exemplary centralized server system 400 that supports collaborative email messages in accordance with certain embodiments of the invention. The centralized server system 400 can include one or more domains, with two domains 402 and 404 being illustrated in FIG. 13.

Domain 402 includes an email server 406, two client computing device 408 and 410 with users associated with email server 406, and an application server 412 associated with email server 406. Domain 404 includes an email server 414 and two client computing devices 416 and 418 with users associated with email server 414. Alternatively, greater or fewer numbers of client computing devices may be included in one or both of domains 402 and 404, and an additional application server (not shown) may be included in domain 404.

Assume that a user of client 408 is the author of a collaborative email message that includes a user of client 416 as a recipient. The collaborative email message is communicated from client 408 to email server 406. Email server 406 stores the content of the collaborative email message at application server 412 and sends a message to email server 414 that includes a unique identifier (e.g., a uniform resource locator (URL)) of the collaborative email message content stored on application server 412. If the recipient at client 416 desires to open and view the message content, the identifier within the message received at email server 414 is selected by the user (e.g., by manual selection or alternatively automatically selected when the user opens the message). In response to the selection, client 416 attempts to access and obtain the identified message content from application server 412.

In the illustrated example, in order for client 416 to access and obtain information from application server 412, client 416 needs to be authenticated to the network that includes domain 402. This authentication can be inherent (e.g., domains 402 and 404 may be in the same corporation's LAN) or alternatively may need to be explicitly obtained (e.g., domains 402 and 404 may be part of two different networks, such as two competitors' LANs). If authentication needs to be explicitly obtained, then client 416 communicates with an authentication authority 420 to authenticate itself to the network that includes domain 402. An indication of whether the client has been authenticated is communicated from authentication authority 420 to application server 412. This authentication can be carried out in any of a wide variety of manners, such as a user id and password.

Once authenticated, client 416 can access the content on application server 412. The content for the collaborative email message is obtained from application server 412 and returned to client 416 for display to the recipient. If the recipient then decides to respond to the collaborative email message, the response is returned to email server 406 (via email server 414) and the message content stored on application server 412 modified in accordance with the response. Notification that the content has been modified may then be communicated by email server 406 to the recipients of the collaborative email message (and possibly the author), although the actual modification need not be communicated as the URL for the content has not changed.

Figure 14:
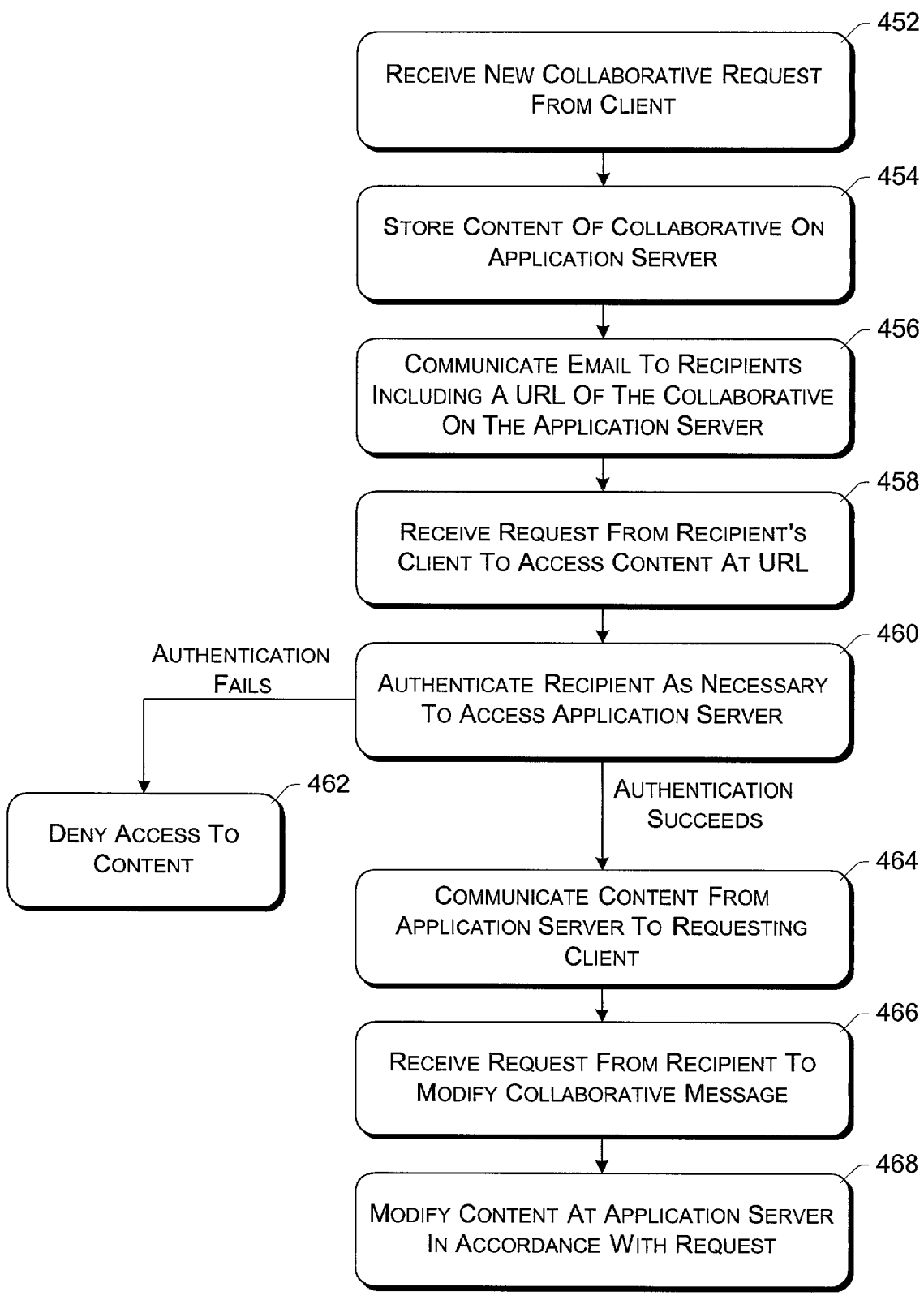
FIG. 14 is a flowchart illustrating an exemplary process for maintaining collaborative email messages in a centralized server system in accordance with certain embodiments of the invention.

FIG. 14 is a flowchart illustrating an exemplary process for maintaining collaborative email messages in a centralized server system in accordance with certain embodiments of the invention. The process of FIG. 14 is discussed with reference to an originator or author of a collaborative email message and a recipient of the collaborative email message, although the process may analogously apply for multiple responses and multiple different recipients.

Initially, a new collaborative email message request is received at an email server from a client device with a user corresponding to the email server (act 452). The content of the collaborative email message is stored on an application server (act 454) and an email including a URL to the content on the application server is communicated to the recipients on the distribution list of the collaborative email message (act 456).

A request to access the content stored at the URL is then received from the client device used by a recipient of the collaborative email message (act 458). The recipient and/or the recipient's client device is authenticated for access to the application server as necessary (act 460). If the authentication fails, then access to the content is denied (act 462). However, if the authentication succeeds, then the content from the application server is communicated to the requesting client device (act 464).

After receiving the content, the recipient can then respond to the collaborative email message. The email server associated with the author of the collaborative email message receives the response (act 466), and modifies the collaborative email message in accordance with the response (act 468).

Figure 15:
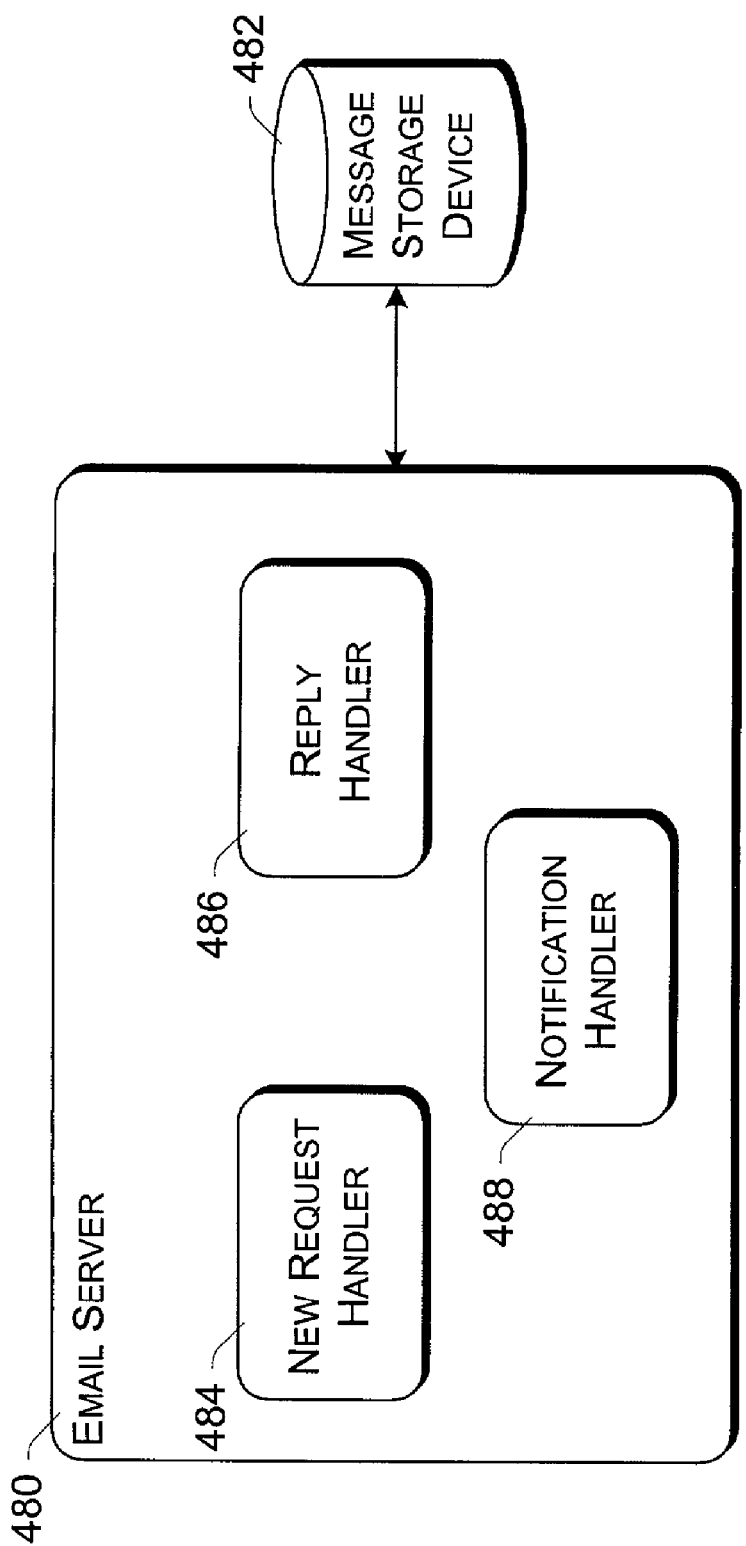
FIG. 15 illustrates an exemplary email server such as may be used to manage collaborative email messages in accordance with certain embodiments of the invention.

FIG. 15 illustrates an exemplary email server such as may be used to manage collaborative email messages in accordance with certain embodiments of the invention. Email server 480 is illustrated as an exemplary server that may perform the functions of a server 104 of FIG. 1, a server 264-268 of FIG. 9, a server 328-332 of FIG. 11, or a server 406 or 414 of FIG. 13. Email server 480 is coupled to a mass storage device 482 on which the email messages are stored. Although illustrated as being separate from email server 480, mass storage device 482 may alternatively be incorporated within email server 480. The information stored on mass storage device 482 varies based on the manner in which server 480 operates to manage collaborative email messages. For example, in a fully distributed system (e.g., discussed above with reference to FIGS. 7 and 8), the actual content of the collaborative email message is stored on device 482, whereas in a centralized application server system (e.g., discussed above with reference to FIGS. 11 and 12), only an identifier of the location of the actual content on an application server is stored on device 482.

Email server 480 includes a new request handler 484, a reply handler 486, and a notification handler 488. New request handler 484 receives and manages requests for new collaborative email messages. Upon receipt of a new collaborative email message request, new request handler 484 stores the necessary information for the collaborative email message (e.g., the actual content or an identifier of a location of the content) on device 482 and sends collaborative email messages to each of the recipients of the new collaborative email message.

Reply handler 486 receives and manages replies to collaborative email messages. Upon receipt of a reply, reply handler 486 alters the content of the collaborative email message in accordance with the reply (e.g., by altering the content stored on device 482 or communicating with an application server to have the content stored at the application server modified in accordance with the reply). Reply handler then sends collaborative email messages to each of the recipients of the reply including the response (or alternatively simply an indication that the content of the collaborative email message has been changed).

Handlers 484-488 also support the ability for a recipient (or author) to delete a collaborative email message. The manner in which collaborative email messages are deleted can vary. Deleting a collaborative email message may cause only a single copy of the collaborative email message to be deleted. For example, in the distributed system of FIG. 9, if the recipient using client 260 deletes the collaborative email message from his or her inbox, then only the copy of the collaborative email message stored at email server 266 is deleted—copies stored at email servers 264 and 268 are not deleted. Alternatively, the copy may not actually be deleted at server 266. For example, if two recipients are associated with email server 266 and only one of the two recipients deletes the collaborative email message, then the identifier of the collaborative email message is removed from that recipients inbox but the copy stored at server 266 is not deleted (because the other recipient has not yet deleted it). In one implementation, reply handler 486 maintains an identifier of the collaborative email message deleted, so that if any subsequent responses to that collaborative email message are received at the server a notification is not made to the user that deleted it. Alternatively, deletion of the collaborative email message may only last until the next response is received, at which point the collaborative email message is again made available to the user that deleted it.

Alternatively, deleting a collaborative email message may cause all copies of the collaborative email message to be deleted. For example, if the author or a specially privileged recipient desires to delete the collaborative email message, then the delete request is forwarded to all email servers that have a copy of the collaborative email message to delete their stored copies. In another alternative, whether to delete all copies or a single copy of the collaborative email message may be a user-selectable option. For example, an options or preferences box or menu may be displayed to the author allowing him or her to identify, upon selecting a delete option, whether to delete a single copy or all copies. By way of another example, the author may be able to identify a password that allows one or more recipients of the collaborative email message to delete all copies if they can provide the proper password.

Server 480 may optionally include any of a wide range of additional functionality to enhance collaborative email messages. Server 480 may optionally support an "unsubscribe" command for collaborative email messages. A recipient (or author) of a collaborative email message can issue an unsubscribe command (e.g., by selection of a menu option, icon, etc.) to have him or herself removed from the distribution list of a collaborative email message. The manner in which the "unsubscribe" command is processed can vary based on the particular implementation of where the distribution list is maintained and how it is updated. For example, if each server were to maintain a copy of the distribution list, then upon receipt of an unsubscribe command for a collaborative email message server 480 alters the distribution list associated with the collaborative email message to remove the user. Server 480 also communicates the unsubscribe command to other email servers associated with recipients on the distribution list, allowing the other servers to similarly remove the user from their copies of the distribution list. Thus, any subsequent replies to a collaborative email message would not be communicated to the unsubscribed recipient.

Server 480 may also maintain additional statistics and/or information regarding recipients who have read and/or responded to collaborative email messages. For example, server 480 may indicate visually through the use of icons or special fonts which recipients of the collaborative email are most active in terms of responding, or being responded to.

Server 480 may further work in conjunction with other components, allowing information from such other components to be incorporated into collaborative email messages or collaborative email message information to be used with the other components. By way of example, server 480 may operate in conjunction with an instant messaging software component, allowing collaborative email messages to be viewed from within the instant messaging user interface. By way of other examples, templates or other collaborative email messages may be communicated from a user's client computing device to another via the instant messaging component, the content of an instant messaging session may be added directly into a collaborative email message, etc.

Server 480 may further provide a reset option for collaborative email messages. This allows the author (or other privileged recipient(s)) of the collaborative email message to clear out all responses to the collaborative email message, optionally identify a new set of recipients, and send the reset collaborative email message to the recipients. Upon receipt of the reset request, server 480 deletes all feedback and responses that have been included in the collaborative email message. Additionally, server 480 resets any portions of the collaborative email message that indicate a number of responses (e.g., used to generate a graph of responses) to indicate that there are zero responses. Such a reset feature is valuable in a variety of circumstances, such as where a user desires to send the same message at different times. For example, a message author may coordinate a weekly lunch meeting and want to send out the same message every week asking meeting attendees what they would like for lunch. The author would be able to use the same collaborative email message, resetting it every week.

The reset option may create a new collaborative email message that uses the same information (except responses/feedback) as the collaborative email message that was reset, or alternatively the collaborative email message being reset itself may have all responses/feedback cleared from it. In the later situation, server 480 may optionally require an acknowledgement from each other server corresponding to a recipient on the distribution list for the collaborative email message being reset. Requiring such an acknowledgement would allow an assurance that all email servers have reset the message prior to any new comments being entered into the reset message.

Figure 16:
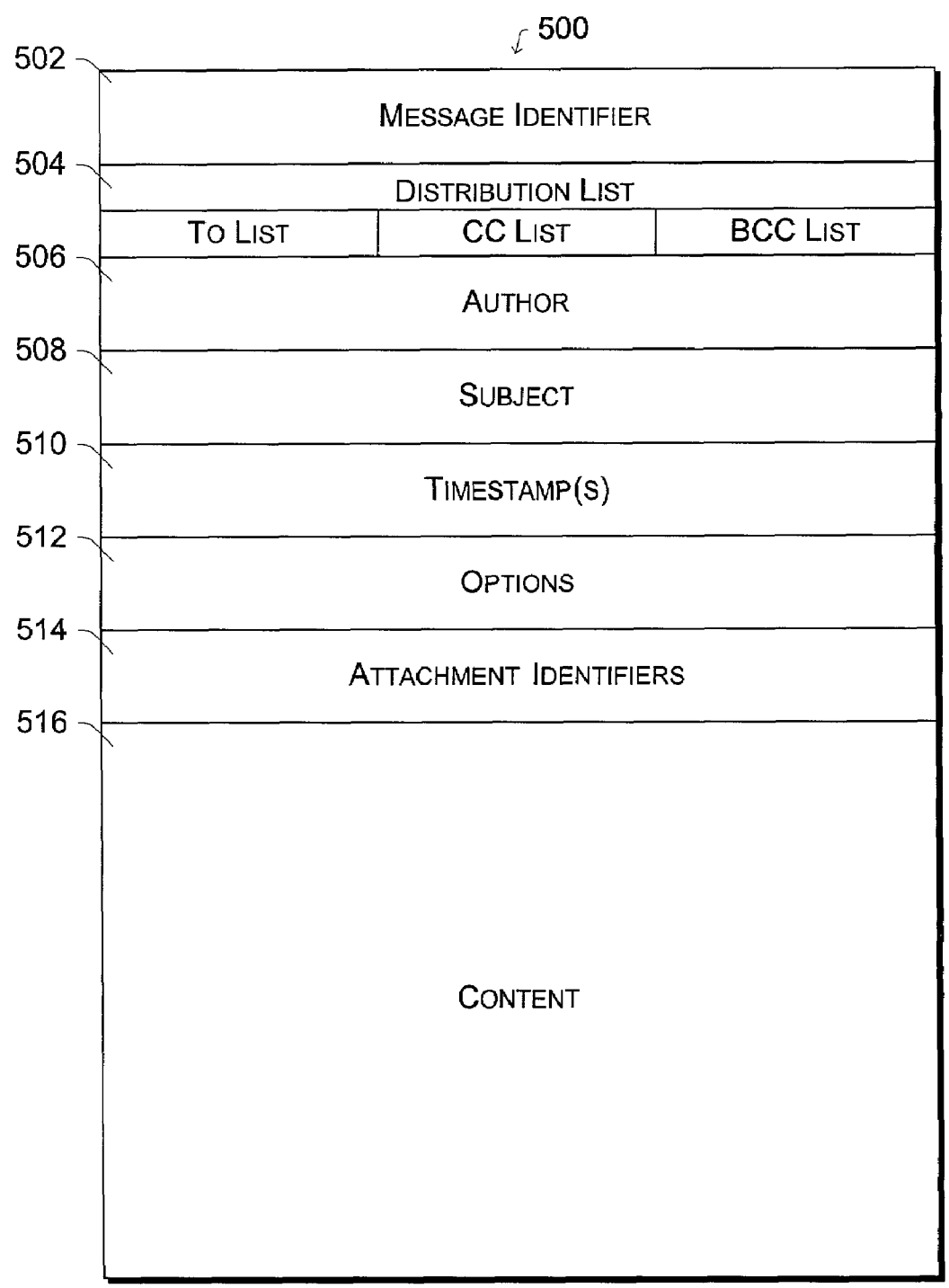
FIG. 16 illustrates an exemplary data structure for storing collaborative email messages in accordance with certain embodiments of the invention.

FIG. 16 illustrates an exemplary data structure for storing collaborative email messages in accordance with certain embodiments of the invention. In the illustrated example, a collaborative email message 500 is illustrated including multiple fields. A message identifier field 502 includes a unique identifier for message 500. Message identifier field 502 may further include additional parent and root identifiers, as discussed above. A distribution list field 504 includes one or more of a "to" list, a "cc" list, and a "bcc" list that together identify the list of recipients to receive collaborative email message 500. An author field 506 includes an identifier of the user that created message 500.

A subject field 508 identifies the subject of message 500, while a timestamp field 510 identifies the date and/or time at which message 500 was created. An options field 512 identifies one or more options associated with message 500, such as a priority for the message, whether the message has been flagged for follow-up, etc. An attachment identifiers field 514 identifies (e.g., by filename) any attachments to message 500. A content field 516 includes the content of message 500, which may be the actual content or an identifier of a location at an application server where the content can be found as discussed above.

Notification

When a new collaborative email message is received, or a response to a collaborative email message is received, a notification of the new/changed collaborative email message should be made to the recipients on the distribution list as well as the author of the collaborative email message. Email component 148 of FIG. 3 optionally includes a notification handler 154. Notification handler attempts to determine an opportune time to render a notification to a user of client 140 of modifications to an existing collaborative email message and/or a new collaborative email message. Such "intelligence" in determining when to render a notification attempts to identify a good time to notify a particular user of a modification to a collaborative email message (or alternatively a new collaborative email message) and waiting until that time to notify the user of the modification.

Determining a good time to notify a particular user can be accomplished by considering one or more factors. Examples of such factors include the following. One factor is the importance of the topic to the user—this can be determined by the user previously identifying the importance, based on a category of the collaborative email message and other messages of the same category (whether collaborative or not) and how quickly the user reads those other messages. Another factor is who is the author of or the recipient that responded to the collaborative email message. Collaborative email messages (either new or replies) from certain individuals (e.g., the user's supervisor or other boss) may be viewed as more important to the user. Another factor is what the user is working on at the time client 140 becomes aware of the new/modified collaborative email message. If the user is working on a response to the same collaborative email message, or on another message or task with the same category, then the new/modified collaborative email message would be viewed as being more important to the user than collaborative email messages having other categories. Another factor is how busy the user currently is. For example, if the user is entering a lot of data (e.g., by typing, voice input, etc.) or having multimedia content rendered, he or she may be viewed as being busy with other tasks and thus notification of the new/modified collaborative email message would be less important. Another factor is a user-selectable notification status. For example, the user may have turned their notification status to "Busy", "Do not Disturb", "Out to Lunch", or some other setting that allows the user to be viewed as being busy with other matters and not to be disturbed by the notification of the new/modified collaborative email message.

Additional notification determinations are made by the email servers (e.g., server 480 of FIG. 15). Notification handler 488 manages communicating notifications of new collaborative email messages and/or collaborative email message modifications (e.g., due to replies) to the author and/or recipient(s) of collaborative email messages that are associated with server 480. Notification handler 488 maintains a record, for each recipient of a collaborative email message (as well as the author), of whether the recipient has read the collaborative email message. Notification handler 488 is also notified of new collaborative email messages by request handler 484 and of replies by reply handler 486. Notification handler 488 then uses this information to identify what notifications to give to the recipients associated with server 480 (as well as the author, if associated with server 480). These notifications include, for example, whether a new collaborative email message has been received, whether replies have been received to previously read collaborative email messages, summary feedback regarding responses received so far, reminders, etc.

Server 480 may further maintain a record of the last time a user associated with server 480 viewed a particular collaborative email message and what changes have been made to the collaborative email message since it was last viewed by the user. Server 480 can then, upon receiving another request from the user to view the collaborative email message, indicate to the user in some fashion what has been changed in the collaborative email message since the last time the user viewed the collaborative email message. This "what's new" identification can be performed in any of a variety of manners, such as hi-lighting new coments/feedback, displaying new comments/feedback in a different font or color, having portions of graph bars that correspond to new responses in a different color or with different shading, etc.

Server 480 may also optionally make other notifications regarding changes to collaborative email messages available to the recipients and/or authors associated with server 480. For example, if a new recipient is added to the collaborative email message (e.g., another address in the "to" or "cc" list), a notification of such (and optionally an indication of who the new recipient is) may be made to the other recipients and/or author. This notification could be a separate notification (e.g., an additional email separate from the collaborative email message), or alternatively embedded within the collaborative email message (e.g., the new recipient's address may be hi-lighted, in a different color, etc.).

Additionally, server 480 and/or the associated users' client devices may employ more intelligent notification mechanisms. These intelligent notification mechanisms attempt to identify a good time to notify a particular user of a modification to a collaborative email message (or alternatively a new collaborative email message) and waiting until that time to notify the user of the modification, analogous to notification handler 154 of FIG. 3.

Figure 17:
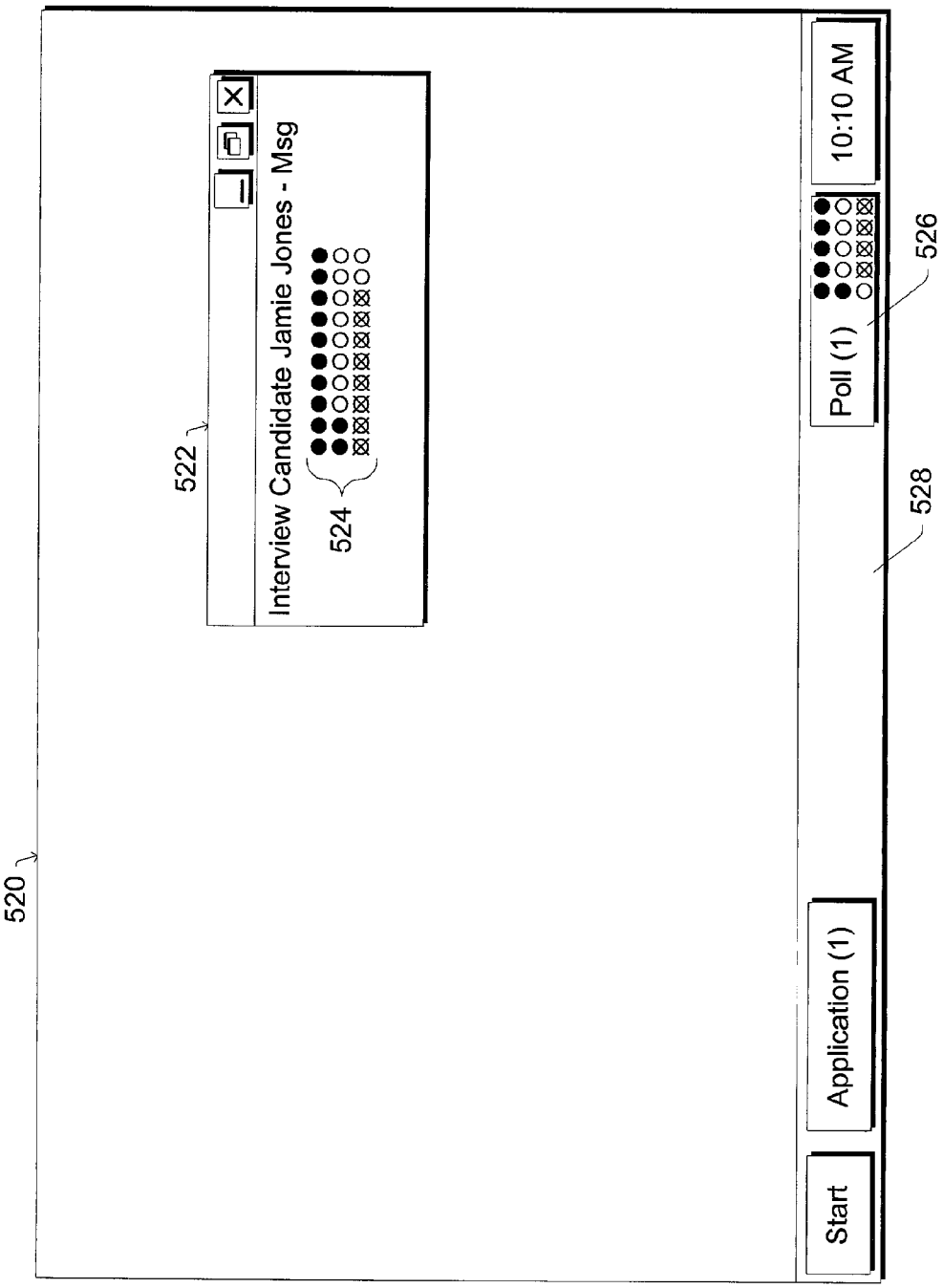
FIG. 17 illustrates an exemplary interface for displaying response feedback to an author in accordance with certain embodiments of the invention.

Additionally, the author of the collaborative email message may receive additional feedback summarizing responses that the various recipients have entered. FIG. 17 illustrates an exemplary interface for displaying response feedback to an author in accordance with certain embodiments of the invention. Feedback for two different collaborative email messages is illustrated on a display 520. A dialog box 522 includes feedback for a first collaborative email message, that is identified with the subject line of the first message ("Interview Candidate Jamie Jones"). The feedback is illustrated with multiple circles 524—each circle corresponds to one recipient. Alternatively, each circle may correspond to multiple recipients, such as when a large number of recipients are included for the collaborative email message. Thus, in the illustrated example, feedback for thirty recipients is illustrated with circles 524.

The circles 524 are displayed in three different manners: empty, filled in, and crossed out. An empty circle represents a recipient that has not yet opened the collaborative email message, a filled in circle represents a recipient that has responded to the collaborative email message, and a crossed out circle represents a recipient that has opened but not responded to the collaborative email message. Thus, a quick glance at dialog box 522 informs the author that eight recipients opened but did not respond to the collaborative email message, twelve recipients responded to the collaborative email message, and ten recipients have not yet opened the collaborative email message.

The manner in which feedback is displayed can vary. For example, different circles may be different colors to represent different information, such as yellow to indicate a recipient that has not yet opened the collaborative email message, green to indicate a recipient that has responded to the collaborative email message, and red to indicate a recipient that has opened but not responded to the collaborative email message. Additionally, different shapes or icons can be used to represent the different feedback options, or actual numerical counts may be listed to identify the number of recipients corresponding to each of the different feedback options.

A button 526 in a taskbar 528 includes the feedback for the second collaborative email message (identified simply as "poll (1)"). The feedback for the fifteen recipients of the collaborative email message is included in button 526 using circles displayed in three different manners, analogous to dialog box 522 discussed above. Button 526 conveys the same information as dialog box 522, although in a smaller form.

It should be noted that the positioning of dialog box 522 and button 526 are exemplary only, and that they may alternatively be located in other positions on display 520.

Which collaborative email messages are to have corresponding feedback displayed as illustrated in FIG. 17 can be identified by the user in any of a variety of manners. For example, the user may "drag and drop" a collaborative email message from his or her inbox or "sent items" box to taskbar 528 to indicate that a feedback summary should be displayed in taskbar 528. By way of another example, a toolbar icon or item from a drop-down menu of a menu bar may be selected to identify that a selected collaborative email message is to have feedback summaries displayed as illustrated in FIG. 17.

Exemplary Operating Environment

FIG. 18 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics (e.g., digital video recorders), gaming consoles, cellular telephones, network PCs, minicomputers, mainframe computers, distributed computing environments that include any of the above systems or devices, and the like.

FIG. 18 shows a general example of a computer 542 that can be used in accordance with the invention. Computer 542 is shown as an example of a computer in which various embodiments of the invention can be practiced, and can be, for example, a client 102 or server 104 of FIG. 1, a client 140 of FIG. 3, a server 480 of FIG. 15, etc. Computer 542 includes one or more processors or processing units 544, a system memory 546, and a bus 548 that couples various system components including the system memory 546 to processors 544.

The bus 548 represents one or more of any of several types of bus structures, including a memory bus or memory controller, a peripheral bus, an accelerated graphics port, and a processor or local bus using any of a variety of bus architectures. The system memory 546 includes read only memory (ROM) 550 and random access memory (RAM) 552. A basic input/output system (BIOS) 554, containing the basic routines that help to transfer information between elements within computer 542, such as during start-up, is stored in ROM 550. Computer 542 further includes a hard disk drive 556 for reading from and writing to a hard disk, not shown, connected to bus 548 via a hard disk drive interface 557 (e.g., a SCSI, ATA, or other type of interface); a magnetic disk drive 558 for reading from and writing to a removable magnetic disk 560, connected to bus 548 via a magnetic disk drive interface 561; and an optical disk drive 562 for reading from and/or writing to a removable optical disk 564 such as a CD ROM, DVD, or other optical media, connected to bus 548 via an optical drive interface 565. The drives and their associated computer-readable media provide nonvolatile storage of computer readable instructions, data structures, program modules and other data for computer 542. Although the exemplary environment described herein employs a hard disk, a removable magnetic disk 560 and a removable optical disk 564, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 560, optical disk 564, ROM 550, or RAM 552, including an operating system 570, one or more application programs 572, other program modules 574, and program data 576. A user may enter commands and information into computer 542 through input devices such as keyboard 578 and pointing device 580. Other input devices (not shown) may include a microphone, joystick, game pad, satellite dish, scanner, or the like. These and other input devices are connected to the processing unit 544 through an interface 568 that is coupled to the system bus (e.g., a serial port interface, a parallel port interface, a universal serial bus (USB) interface, etc.). A monitor 584 or other type of display device is also connected to the system bus 548 via an interface, such as a video adapter 586. In addition to the monitor, personal computers typically include other peripheral output devices (not shown) such as speakers and printers.

Computer 542 operates in a networked environment using logical connections to one or more remote computers, such as a remote computer 588. The remote computer 588 may be another personal computer, a server, a router, a network PC, a peer device or other common network node, and typically includes many or all of the elements described above relative to computer 542, although only a memory storage device 590 has been illustrated in FIG. 18. The logical connections depicted in FIG. 18 include a local area network (LAN) 592 and a wide area network (WAN) 594. Such networking environments are commonplace in offices, enterprise-wide computer networks, intranets, and the Internet. In certain embodiments of the invention, computer 542 executes an Internet Web browser program (which may optionally be integrated into the operating system 570) such as the "Internet Explorer" Web browser manufactured and distributed by Microsoft Corporation of Redmond, Wash.

When used in a LAN networking environment, computer 542 is connected to the local network 592 through a network interface or adapter 596. When used in a WAN networking environment, computer 542 typically includes a modem 598 or other means for establishing communications over the wide area network 594, such as the Internet. The modem 598, which may be internal or external, is connected to the system bus 548 via a serial port interface 568. In a networked environment, program modules depicted relative to the personal computer 542, or portions thereof, may be stored in the remote memory storage device. It will be appreciated that the network connections shown are exemplary and other means of establishing a communications link between the computers may be used.

Computer 542 also includes a broadcast tuner 600. Broadcast tuner 600 receives broadcast signals either directly (e.g., analog or digital cable transmissions fed directly into tuner 600) or via a reception device (e.g., via antenna or satellite dish).

Computer 542 typically includes at least some form of computer readable media. Computer readable media can be any available media that can be accessed by computer 542. By way of example, and not limitation, computer readable media may comprise computer storage media and communication media. Computer storage media includes volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 542. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. An email application for integrating communications of both collaborative and non-collaborative email messages, wherein a collaborative email message is an email message communicated among a plurality of recipients that dynamically incorporates information provided by the recipients into the message content, comprising:
    an email inbox display for identifying incoming email messages, wherein the email inbox display provides an indication for distinguishing collaborative email messages from non-collaborative email messages; and
    a message display, comprising a message content area for displaying an email message selected to be opened from the email inbox display, wherein, when the selected email message is a collaborative email message, the message display further comprises an interface enabling a recipient to modify the message content of the collaborative message, the modified message then being sent to all recipients of the collaborative email message;
    wherein the email inbox display provides an indication whenever contents of a collaborative email message have been modified by another recipient since the collaborative email was last opened.

2. The email application of claim 1, wherein the indication for distinguishing collaborative email messages from non-collaborative email messages is text.

3. The email application of claim 1, wherein the indication for distinguishing collaborative email messages from non-collaborative email messages is an icon.

4. The email application of claim 1, further comprising a searcher by which a user can search for messages that are collaborative email messages.

5. The email application of claim 1, wherein the email inbox user display identifies unread incoming messages in boldface type and read messages in non-boldface type, and wherein a collaborative email message listed in the inbox is changed from non-boldface type to boldface type when changes have been made to the collaborative email message since the message was last opened.

6. The email application of claim 5, wherein, in the message display, comments that have been added to the collaborative email message since the recipient last viewed the message are identified differently from those comments that already had been viewed.

7. The email application of claim 1, wherein in the message display, identification is provided of which recipients have added requested information to the collaborative email message.

8. The email application of claim 1, wherein the email inbox indicates whenever contents of a collaborative email message have been modified by another recipient since the collaborative email was last opened by marking the email as unread.

9. The email application of claim 1, wherein the email inbox indicates whenever contents of a collaborative email message have been modified by another recipient since the collaborative email was last opened by moving the identified collaborative email to the top of the inbox.

10. A method for integrating communications of collaborative and non-collaborative email messages using an email application client, wherein a collaborative email message is an email message communicated among a plurality of recipients that dynamically incorporates information provided by the recipients into the message content, comprising:
    identifying in an email inbox display incoming email messages and providing an indicator for distinguishing collaborative email messages from non-collaborative email messages;
    displaying in a message display an email message selected to be opened from the email inbo display, wherein, when the selected email message is a collaborative email message, prompting a recipient to modify the message content of the collaborative message in a message body within the display window at least one section for recipients of the collaborative email message to provide requested collaborative information, the modified message then being sent to all recipients of the collaborative email message; and
    providiing an indicator in the email inbox display whenever contents of a collaborative email message have been modified by another recipient since the collaborative email was last opened.

11. The email application client of claim 1, wherein the indication for distinguishing collaborative email messages from non-collaborative email messages is text.

12. The email application client of claim 1, wherein the indication for distinguishing collaborative email messages from non-collaborative email messages is an icon.

13. The email application client of claim 1, further comprising a searcher by which a user can search for only messages that are collaborative email messages.

14. The email application client of claim 1, wherein the email inbox display identifies unread incoming messages in boldface type and read messages in non-boldface type, and wherein a collaborative email message listed in the inbox is changed from non-boldface type to boldface type when changes have been made to the collaborative email message since the message was last opened.

15. The email application client of claim 5, wherein, in the message display, comments that have been added to the collaborative email message since the recipient last viewed the message are identified differently from those comments that already had been viewed.

16. The email application client of claim 1, wherein in the message display, identification is provided of which recipients have added requested information to the collaborative email message.

17. The email application of claim 1, wherein the email inbox indicates whenever contents of a collaborative email message have been modified by another recipient since the collaborative email was last opened by marking the email as unread.

18. The email application of claim 1, wherein the email inbox indicates wheneveir contents of a collaborative email message have been modified by another recipient since the collaborative email was last opened by moving the identified collaborative email to the top of the inbox.

19. A computer-readable medium having computer-executable instructions for performing a method for communicating both collaborative and non-collaborative email messages using an email application client, wherein a collaborative email message is an email message communicated among a plurality of recipients that dynamically incorporates into a message body information provided by the recipients, comprising:

identifying in an email inbox user display incoming email messages stored in an email server associated with the email application client, and providing an indicator for distinguishing collaborative email messages from non-collaborative email messages;

displaying in a message display window an email message selected from the email inbox user display, further displaying a command toolbar of selectable email user commands and a message body display area within the window;

wherein, when the selected email message is a collaborative email message retrieved from the email server, displaying in the message body display area at least one section for recipients of the collaborative email message to provide requested collaborative information, incorporating the collaborative information into the collaborative email by modifying the contents of the collaborative email message stored in the email server, and sending the modified message to other email servers associated with each other collaborative email message recipient.

* * * * *